(12) United States Patent
de Moura Rocha Lima et al.

(10) Patent No.: US 10,063,658 B1
(45) Date of Patent: Aug. 28, 2018

(54) DEDICATED NETWORK PLATFORM FOR DATA PRODUCING DEVICES THAT EMULATES DISTINCT DATA AND CONTROL CHANNELS VIA BIFURCATION OF SINGLE CHANNEL ENVIRONMENTS

(71) Applicant: V2COM, Inc., Austin, TX (US)

(72) Inventors: Leonardo de Moura Rocha Lima, Campinal (BR); Guilherme Spina, São Paulo (BR)

(73) Assignee: V2COM, INC., Austin, TX (US)

( * ) Notice: Subject to any disclaimer, the term of this patent is extended or adjusted under 35 U.S.C. 154(b) by 270 days.

(21) Appl. No.: 15/143,143

(22) Filed: Apr. 29, 2016

Related U.S. Application Data

(60) Provisional application No. 62/155,094, filed on Apr. 30, 2015.

(51) Int. Cl.
*G06F 15/177* (2006.01)
*H04L 29/08* (2006.01)
*H04L 29/06* (2006.01)

(52) U.S. Cl.
CPC .......... *H04L 67/34* (2013.01); *H04L 67/1097* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 4,903,015 A * | 2/1990 | Van Steenbrugge | ... | H04L 12/44 307/112 |
| 4,958,342 A * | 9/1990 | Williams | ............... | H04L 12/525 370/465 |
| 5,448,554 A * | 9/1995 | Van Steenbrugge | ........................ | H04L 12/40032 370/252 |
| 5,479,498 A * | 12/1995 | Brandman | ............... | H04L 27/30 379/283 |
| 6,014,705 A * | 1/2000 | Koenck | ................. | G06F 1/1613 709/200 |
| 6,697,364 B1 * | 2/2004 | Kekki | ................... | H04J 3/1682 370/389 |
| 2004/0018851 A1 * | 1/2004 | Koenck | ................. | G06F 1/1626 455/550.1 |
| 2004/0243386 A1 * | 12/2004 | Stolowitz | .............. | G06F 3/0626 703/25 |
| 2006/0007888 A1 * | 1/2006 | Lee | ....................... | H04W 36/18 370/330 |

(Continued)

*Primary Examiner* — Brian P Whipple

(57) ABSTRACT

Systems and processes of a dedicated network platform for data producing devices that emulates distinct data and control channels via bifurcation of single channel environments are disclosed as well as a process for making a firmware update on a remote data producing device. For example, in a single channel environment, the system provides a control sub-channel for transmission of the control information. Control instructions may be transmitted via the control sub-channel. A data sub-channel may be provided for transmission of data (e.g., logged data). The data may be transmitted via the data sub-channel. As for the update process, a firmware update for an application may be received over a network by a remote device, the firmware stored to a data store and the remote device rebooted to update the firmware.

17 Claims, 16 Drawing Sheets

(56) References Cited

U.S. PATENT DOCUMENTS

| | | | |
|---|---|---|---|
| 2008/0117810 A1* | 5/2008 | Stott | H04L 12/66 370/230 |
| 2008/0313601 A1* | 12/2008 | Huang | G06F 17/5027 717/105 |
| 2009/0046681 A1* | 2/2009 | Kalogridis | H04W 72/1289 370/338 |
| 2010/0067458 A1* | 3/2010 | Tanigawa | H04L 5/1484 370/329 |
| 2012/0210384 A1* | 8/2012 | Cirstea | G06F 3/1454 725/127 |
| 2012/0210385 A1* | 8/2012 | Cirstea | H04N 7/102 725/127 |
| 2014/0201318 A1* | 7/2014 | Dajani | H04L 69/16 709/217 |
| 2014/0376473 A1* | 12/2014 | Leng | H04W 76/10 370/329 |
| 2018/0027099 A1* | 1/2018 | Dajani | H04L 41/0896 |

* cited by examiner ized at the equipment or devices that are produced, but do not have the expertise to add the technical communication features required for connectivity.

DEDICATED NETWORK PLATFORM FOR DATA PRODUCING DEVICES THAT EMULATES DISTINCT DATA AND CONTROL CHANNELS VIA BIFURCATION OF SINGLE CHANNEL ENVIRONMENTS

PRIORITY

This application claims priority to U.S. Provisional Application No. 62/155,094, filed Apr. 30, 2015, entitled "PROTOCOL AND COMMUNICATION ABSTRACTION LAYER, ABSTRACTING PROTOCOLS AND COMMUNICATION NETWORKS FOR INTERNET OF THINGS SYSTEMS," which is hereby incorporated by reference in its entirety.

BACKGROUND

Description of the Related Art

Many devices are not yet part of respective networks, some of which may be referred to as the Internet of Things (IoT). Many ubiquitous and non-ubiquitous objects from light bulbs to door locks, coffee makers to utility meters) are not interconnected, or are not connected to a network, such as the Internet, at all. Although devices may be physically near-to a network via which the devices could connect, the world is filled with legacy devices that do not have the features necessary for communication via that network.

Many device manufacturers are specialized at the equipment or devices that are produced, but do not have the expertise to add the technical communication features required for connectivity.

Development (e.g., IoT development) has many complexities: different networks & protocols, firmware provisioning & lifecycle management, security and identification. What is needed is a hardware and/or software solution that facilitates addition of connectivity to new and/or existing devices, facilitating the additional of interconnectivity to legacy devices such that the devices can exhibit the benefits of additional functionality that come with membership in a network.

SUMMARY

Various methods and apparatus for providing protocol and communication abstraction layers that abstract protocols and communication networks for an Internet of things systems are disclosed. For example, various processes, devices and systems disclosed herein simplify the development of a unified operating system for an Internet of things that runs on a broad variety of hardware platforms, turning developers that are specialized in other fields (e.g., the development of various legacy devices) into builders of IoT Apps for example. Some process, apparatus and systems disclosed herein facilitate a manufacturer's transformation of static, single purpose products them into intelligent connected devices, accelerating time-to-market and boosting profit potential.

In some embodiments, described herein is a common architecture for a system for data gathering, storage, manipulation, and visualization that provides a system that works across various industries. For example, the disclosure provides an arrangement of various software and hardware components that provide a customized system while minimizing the amount of custom work needed to implement the system.

In at least one embodiment, an apparatus includes computer hardware such as legacy hardware and interconnectivity firmware. The legacy hardware may execute legacy program instructions to perform legacy functionality and generate legacy data. The interconnectivity firmware may be configured to implement interconnectivity functionality, as described herein. For example, wherein the interconnectivity functionality sends messages to and receives messages from a device management provider system that is remote from the apparatus. In one example, a legacy power meter (or a coffee maker, for example, the particular legacy device may be any legacy device) may be configured with interconnectivity firmware that sends usage data to a power provider server that stores the data. Such an adaptation of the legacy device may convert the legacy device from a standalone device to an interconnected device capable of communication among an internet of things network, for example.

The interconnectivity firmware may be configured to implement an interconnectivity module configured to provide a transaction layer interface comprising program instructions that interconnect a communication layer protocol of the interconnectivity firmware with a transaction layer protocol such that common program instructions of the transaction layer are configured to access hardware controls irrespective of hardware type. For example, the various different legacy devices may be suited for different types of interconnectivity hardware (e.g., based on design considerations such as packaging constraints, business constraints such as cost, or the like). Various interfaces that are particular to different respective types of interconnectivity hardware may be configured such that applications or program instructions operating at a higher layer do not have to be customized or rewritten to work with different types of hardware. In some embodiments, higher layer software may be reused across different types of hardware, even though the hardware would not normally support the higher layer software without customization. In embodiments, interfaces may be provided that facilitate rapid prototyping and development of interconnected devices.

In embodiments, the interconnectivity hardware and/or software (e.g., firmware) may send data to the device management provider via a transaction layer interface that is particularly suited for particular hardware.

The transaction layer interface may be one of two or more transaction layer interfaces, in embodiments. Each respective transaction layer interface may be configured to interface with a different hardware type than the other respective transaction layer interface. For example, where each respective transaction layer interface is particular to the different respective hardware type.

In some instances, at least one difference between the different respective hardware types is the access for a respective analog-to-digital converter of each different hardware type. For example, wherein each respective transaction layer interface is particularly configured to access the respective analog-to-digital converter such that common transaction layer program instructions can be used to access either type of the different respective hardware types.

The interconnectivity module may be further configured to perform various functions such as apparatus discovery, apparatus registration, apparatus life cycle management, and/or transaction monitoring. Apparatus discovery may include establishment of a communications link between the interconnected device and another device or server. Apparatus registration may include registering a device id with another device or server. Transaction monitoring may include monitoring of device usage, or other device functionality (e.g., legacy functionality) in embodiments.

In some instances, the interconnectivity module (or the server of the service provider) may be further configured to instantiate a device object representative of the apparatus. For example, for interconnectivity modules of a power meter, a power meter device object may be instantiated that has various software object attributes, for instance, a device object message frequency attribute and a device object id attribute. A message frequency attribute may determine the frequency at which data is transmitted from the legacy device to a server, for example. For instance, a power meter may send an indication of power usage every 15 minutes, every hour or the like. A device object id attribute may comprise a unique id for the device, such as a geographically unique identifier (GUID), for example.

The interconnectivity firmware may be further configured to implement a proprietary transaction layer that provides transaction layer connectivity between the apparatus, the device management provider system, one or more legacy systems, and client devices that are configured to display data generated by the apparatus, in embodiments. For example, custom transaction layer (or communication layer) program instructions may be configured to access various different types of hardware, while presenting a common API to the next layer (e.g., the communication layer or visualization layer, respectively).

In some embodiments, an interconnectivity interface may be configured to interconnect the legacy hardware with the interconnectivity firmware such that the legacy data generated via legacy hardware and legacy program instructions are transmitted from the legacy hardware via the transaction layer interface to the device management provider system.

Figure 1A:
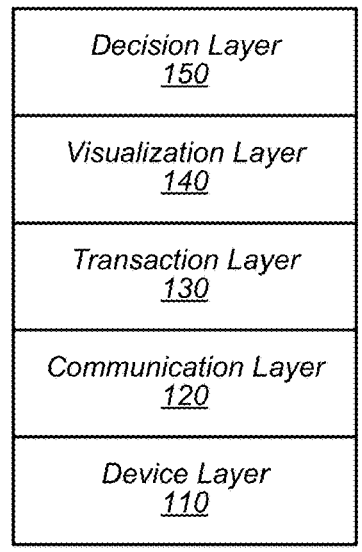
FIG. 1A illustrates protocol and communication abstraction layers for an internet of things system, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In some embodiments, a device management provider residing on a network communicates over communication channels with devices (e.g., sensors, or remotely controllable devices) to send and receive data from devices over communication channels.

Some embodiments include an internet of things (IOT) wrapper or interconnectivity module that implements a protocol and communication abstraction layer, abstracting protocols and communication networks for internet of things (IOT) systems.

Some embodiments support various security techniques such as whitelisting. For example, comparing an identifier of the control device to expected values of the control device.

Some embodiments support analytics. For example, a device management provider may compare the recent data of the device to expected or historical values.

The device management provider and/or the IOT wrapper (e.g. interconnectivity module 202a/b) may in some embodiments may be implemented by a non-transitory, computer-readable storage medium and one or more processors (e.g., CPUs and/or GPUs) of a computing apparatus. In such embodiments, a computer-readable storage medium may store program instructions executable by the one or more processors to cause the computing apparatus to perform device and other aspects as described herein.

Other embodiments of the device management provider and/or IOT wrapper (e.g., interconnectivity module 202a/b) may be at least partially implemented by hardware circuitry and/or firmware stored, for example, in a non-volatile memory or non-transitory computer-readable storage medium.

Example Implementations

FIG. 1A illustrates protocol and communication abstraction layers for an internet of things device and/or system, according to some embodiments. In embodiments, device layer 110 comprises the physical layer of the device, hardware, components, sensors, processors, memory or the like, for example.

In embodiments, the physical layer may include legacy portions and interconnectivity portions. For example, known devices such as anything from coffee makers to electrical power grid meters include various components that perform the functionality (e.g., basic underlying functionality) of the device. A coffer maker may have a circuit board that controls the heater with a timer and supports various input/output such as taking instructions for how long to brew and instructing display of how much brew time is left, for example. A power meter may include hardware such as a display and various circuitries that supports display of information such as the amount of power used for a period time. These and other devices may include various sensors, computer hardware, displays and the like that support functionality that is not related to interconnectivity. For example, most power meters and coffee makers do not connect to a data network, do not connect to other devices of the same type and are not configured to connect to one another (devices of different types). Legacy devices may not have the hardware to support such interconnectivity. In some embodiments, the physical layer comprises the physical layer of the Open Systems Interconnection model (OSI model).

In embodiments, the communication layer 120 handles matters related to communication. For example, a connection may be established between a device and a server (e.g., the connection initiated by either) and in some embodiments, the connection may remain open or available for data traffic, such as sending data from a device (e.g., a legacy device) or receiving data at the device (e.g., control instructions instructing the device). In some embodiments, the communication layer may be configured to send and/or receive data periodically (e.g., every few second, minutes or days) or may be configured to send and/or receive data continuously. In some embodiments, the frequency of transmission may be configurable or in response to a trigger or event, for example. In some embodiments, the communications layer does not perform any functions that are business related such as business processes (e.g., billing, visualization, or decision-making). In embodiments, the data at the communications layer is passed onto the transaction layer. In some embodiments, the communication layer 120 comprises one or more of the data link layer, network layer, transport layer and/or session layer of the Open Systems Interconnection model (OSI model).

In embodiments, the transaction layer 130 includes business processes and equipment protocols. In some embodiments, the transaction layer 130 includes the presentation layer of the Open Systems Interconnection model (OSI model).

The visualization layer 140 may include data management (e.g., consolidated, consistent and authoritative master data delivered across an enterprise). Data may be stored at the visualization layer and software applications may access the data and present the data in various manners. Various business processes may run within the visualization layer (e.g., a billing process). In some embodiments, the visualization layer distributes the master information to some or all operational and analytical applications, for example. In embodiments, capabilities are designed for mastering data across multiple domains ranging from: Customer, Supplier, Site, Account, Asset or Product, and the like.

The decision layer 150 is a layer where the data itself drives or triggers some action (action-enabling capabilities), in embodiments. For example, data may be analyzed and a determination made from analysis of the data that a failure is about to happen (e.g., a power failure) or that tampering is on-going (a power meter is being tampered with). In some embodiments, the decision layer comprises complex event processing. For example, data analytics may determine patterns from the data and make decisions based on the patterns. For instance, a power meter that regularly consumes 100 watts of power might be flagged when the meter is only reporting half that much (e.g., likely due to tampering). Various other trends may be analyzed and used as triggers for various events such as message notification (e.g., tampering notification, technical failures, and diagnostics). In embodiments, the visualization layer 150 and decision layers comprise the application layer of the Open Systems Interconnection model (OSI model).

In some embodiments, a legacy device (e.g., a power meter) may be configured with a particular protocol that requires translation to be accessed by common commands of one of the layers (e.g., communications or transaction layers). For example, an interface between the particular protocol of the device and the transaction layer 130 or communication layer 120 of the model.

In some embodiments, a device with legacy portions may be configured (e.g., reconfigured or converted) with an interconnectivity portion. For example, a device with some minimum of hardware support may be configured with additional software (additional software to run on the existing legacy hardware) to convert the device from a legacy device to an interconnected device. In another example, a device without some minimum hardware support may be configured with additional hardware (e.g., interconnectivity hardware) and additional software (interconnectivity software) such that the device is transformed from a legacy device into an interconnected device.

Figure 1B:
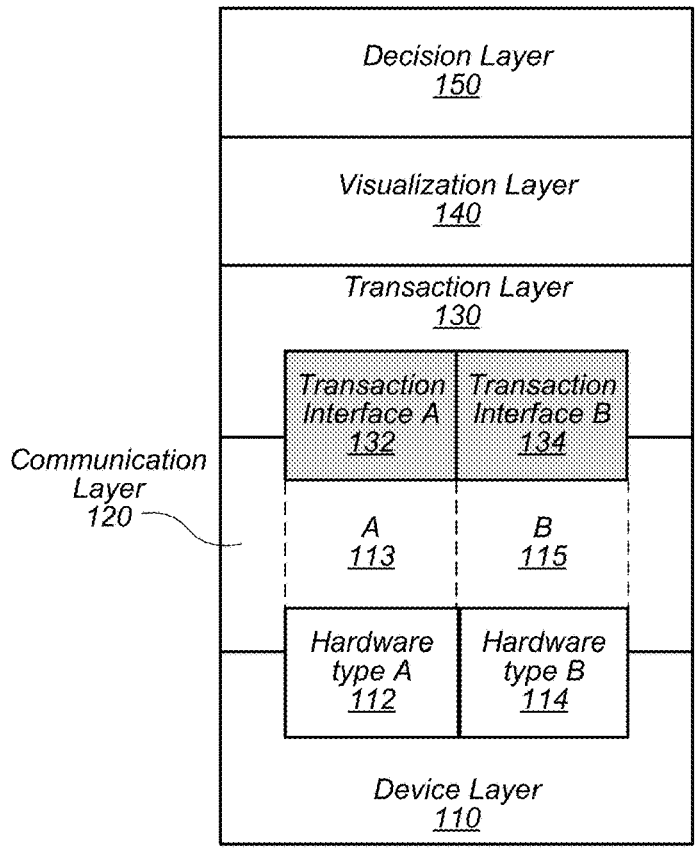
FIG. 1B illustrates protocol and communication abstraction layers for an internet of things system, according to some embodiments.

FIG. 1B illustrates protocol and communication abstraction layers for an internet of things system, according to some embodiments. In the illustrated embodiment, the device layer is illustrated with two different hardware types. The hardware types can vary across embodiments. For example, analog-to-digital control (ADC control) may vary among different devices from different manufacturers. In the illustrated example, hardware type A 112 is a hardware type that is different from hardware type B 114. In one example, access to the ADC control of hardware type A 112 is different from access to the ADC control of hardware type B 114.

In some embodiments, access via the communication layer 120 for hardware type A 112 is different from access via the communication layer 120 for hardware type B 114. For instance, hardware type A 112 may be configured to be accessed only via communication layer A 113 (e.g., via one proprietary access) while hardware type B 114 may be configured to be accessed only via communication layer B 115 (e.g., via a different proprietary access).

An interface may be configured to bridge or translate the differences between the hardware types, in embodiments. In the illustrated embodiment, transaction interface A 132 is configured to translate or bridge the differences (e.g., differences at the communications layer A 113 or differences at the device layer 110 for hardware type A 112). Transaction interface B 134 is configured to translate or bridge the differences (e.g., differences at the communications layer B 115 or differences at the device layer 110 for hardware type B 114). In embodiments, each respective transaction interface A/B is configured to translate the differences such that each of the different respective hardware types A/B can be accessed by common instructions (e.g., common instructions at the transaction layer 130). For example, if one device includes hardware type A 112 and another device includes hardware type B 114, as long as the device includes transaction layer interface software (e.g., transaction interface A 132 or transaction interface B 134, respectively), common instructions at the transaction layer 130 will execute equally on hardware type A 112 and hardware type B 114. In some instances, one or more API's written at the transaction layer 130 will execute equally on different hardware types based on the transaction layer interface that is configured particular to the respective hardware type.

In some embodiments, data at the communication layer is processed (e.g., converted) to become part of the transaction layer. For example, data may be translated, summed, averaged or otherwise processed as it is translated from the communications layer to the transaction layer. In some embodiments, the communications layer 120 or the transaction layer 130 may be configured to perform the processing. There are some functions or services that are not tied to a given layer, but they can affect more than one layer, in embodiments.

Figure 1C:
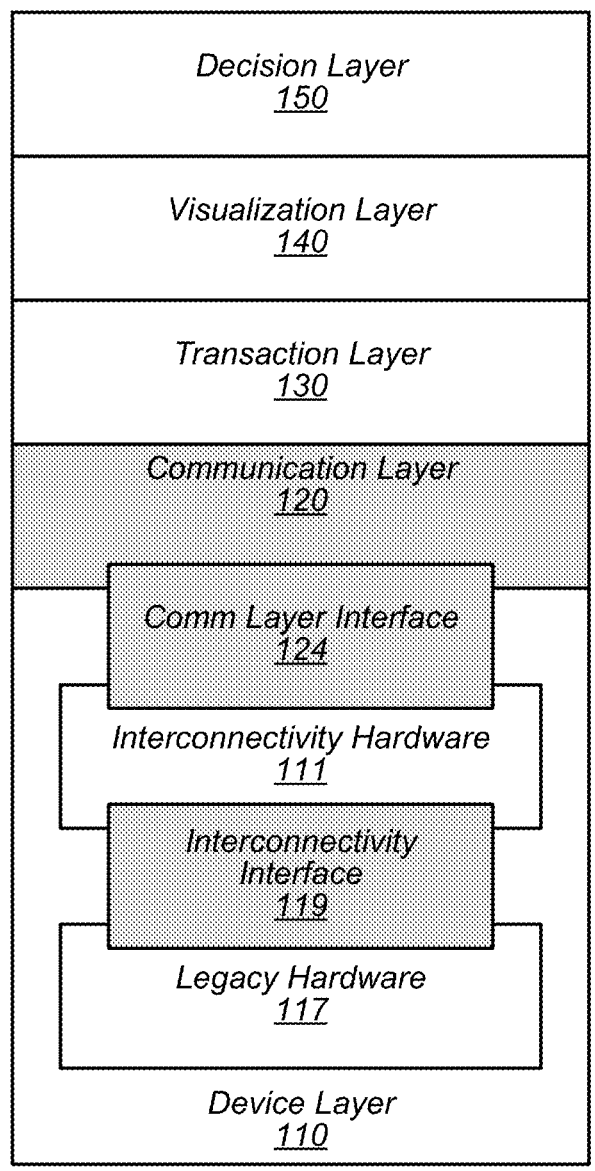
FIG. 1C illustrates hardware, protocols and communication abstraction layers for an internet of things system, according to some embodiments.

FIG. 1C illustrates hardware, protocols and communication abstraction layers for an internet of things system, according to some embodiments. In the illustrated embodiment, device layer 110 includes legacy hardware 112 and interconnectivity hardware 115.

Legacy Hardware

In embodiments, legacy hardware 117 includes hardware for an existing device that is not a connected device. A non-exhaustive lists of example legacy devices including legacy hardware includes anything from various consumer appliances such as dishwashers, coffeemakers or refrigerators that have some digital functionality but are not connected to other devices, to consumer electronics such as audio/video devices (e.g., televisions and stereos) that are not connected to the Internet, to industrial equipment such as power stations or construction equipment that have some digital functionality but are not connected to other devices or to the Internet. In some embodiments, legacy hardware includes any device, machine or component with electronic hardware. In some embodiments, legacy hardware is hardware that performs any functionality other than interconnectivity between devices or to a network (e.g., the Internet). In some embodiments, legacy hardware includes hardware that already existed prior to the time that interconnectivity firmware was incorporated into the device that includes the legacy hardware. However, in some embodiments, legacy hardware may include new hardware that performs any functionality other than interconnectivity between devices or to a network. In various embodiments, legacy hardware may include firmware, memory, CPUs, ASICs, etc. or any combination thereof.

Interconnectivity Firmware

In embodiments, interconnectivity hardware 111 may include firmware, memory, CPUs, ASICs, etc. or any combination thereof. Legacy hardware 117 and interconnectivity hardware 111 may be combined in various manners. For example, in some instances, existing legacy hardware for a device may be sufficient to run interconnectivity software and/or transaction layer interface software. In such embodiments, the addition of an interconnectivity software module may be sufficient to convert a legacy device into an interconnected device with functionality supporting participation in an internet of things, for example. In such embodiments, the addition of interconnectivity hardware may not be necessary. In another embodiment, legacy hardware may be insufficient to run interconnectivity software and/or transaction layer interface software. In such embodiments, the addition or incorporation of interconnectivity hardware 111 may be required to support interconnectivity software and/or transaction layer interface software, for example. In some embodiments, the additional hardware may include a firmware addition to legacy hardware. In some embodiments, legacy hardware may be completely replaced with interconnectivity hardware (e.g., firmware) that performs both legacy functionality for the device as well as interconnectivity functionality for the device.

Interconnectivity Interface

In the illustrated embodiment, legacy hardware 117 and interconnectivity hardware 111 are coupled via interconnectivity interface 119. Interconnectivity interface 119 may include any of various combinations of hardware connections and/or software connections between the interconnectivity hardware 111 and legacy hardware 117. For example, an I/O interface of the legacy hardware 117 may be connected to an I/O interface of interconnectivity hardware 111. Interconnectivity interface 119 may include off the shelf components or proprietary components, in embodiments.

Interconnectivity interface 119 acts as the glue to connect legacy hardware that performs legacy functionality of a device with interconnectivity hardware that performs interconnectivity functionality, in embodiments.

Communication Layer Interface

In at least the illustrated embodiment, Comm layer interface 124 provides an interface between the interconnectivity hardware 111 and communication layer 120. In some instances, Comm layer interface 124 may be configured to provide an interface that is particular to the interconnectivity hardware 111. For example, similar to how transaction interface A 132 and transaction interface B 134 may each be separately configured as interfaces to different hardware 112/114 and respective differences in the communication layer (e.g., 113/115) of the respective different hardware, multiple different Comm layer interfaces may be custom configured to act as an interface to different types of interconnectivity hardware. In some instances, communication layer 120 may include multiple different Comm layer interfaces 124, each particular to a particular type of interconnectivity hardware 111.

Figure 1D:
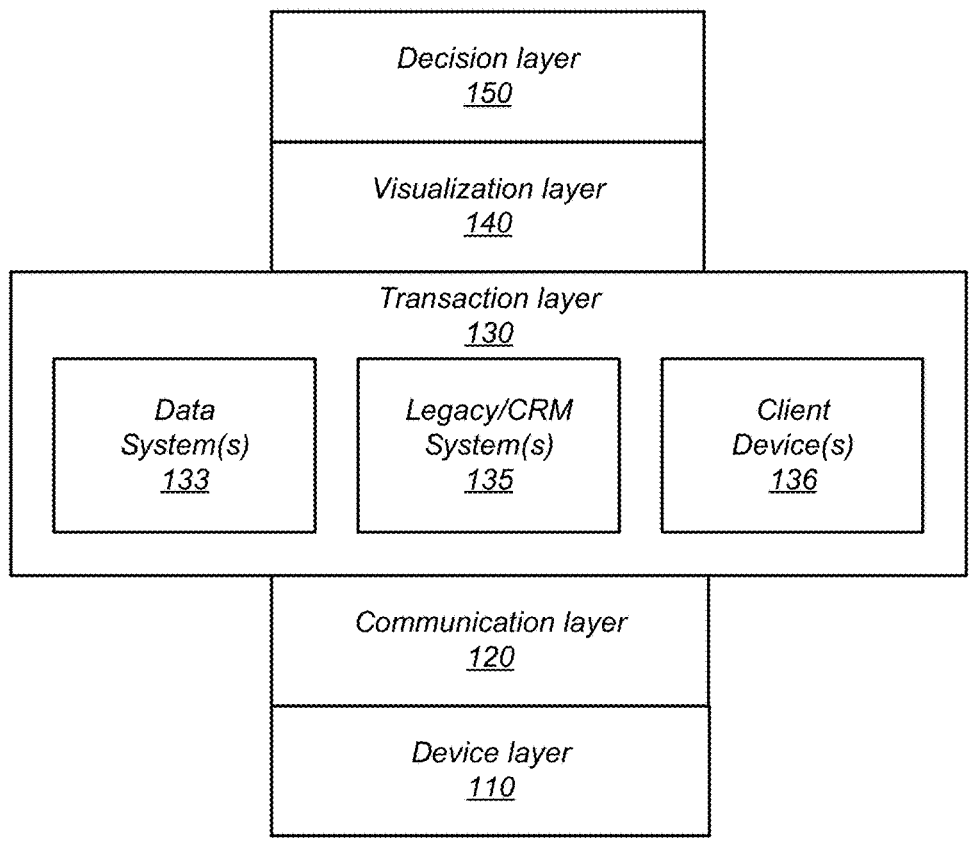
FIG. 1D illustrates protocol and communication abstraction layers for an internet of things system, according to some embodiments.

FIG. 1D illustrates protocol and communication abstraction layers for an internet of things system, according to some embodiments. FIG. 1D illustrates a transaction layer 130. In some embodiments, the transaction layer 130 may be configured to integrate across device management system(s) 132, legacy system(s) (e.g., legacy business systems such as customer relationship management (CRM) systems or billing systems), client device(s) or the like. For example, client devices 136 (e.g., data consuming devices such as business clients, mobile clients, web clients or other systems) may communicate via one particular protocols while a device management system 132 and a legacy billing system may communicate via other particular protocols. The transaction layer 130 may be modified or configured to facilitate communication between the different protocols. For example, the transaction layer 130 may be configured to provide wrappers (e.g., an API) for the client device 136 or legacy systems 134. In some embodiments, the transaction layer 130 may be modified or configured such that existing visualization layer 140 or decision layer 150 applications can execute within an environment with device management systems 132, legacy/CRM systems 134, or client devices that use various different protocols that do not natively interoperate with visualization layer 140 or decision layer 150 applications.

Figure 2:
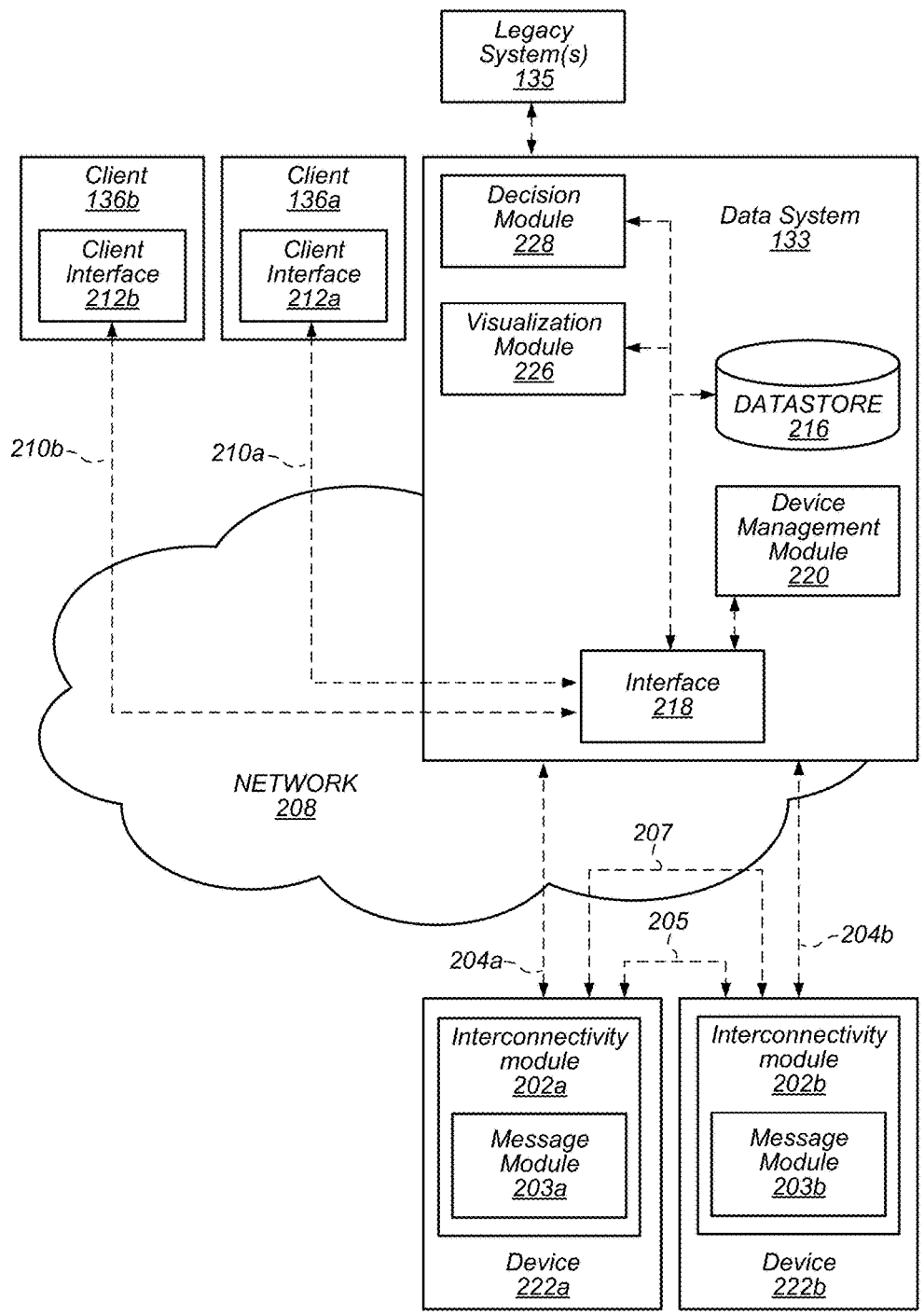
FIG. 2 depicts a system that implements protocol and communication abstraction layers for an internet of things, according to some embodiments.

FIG. 2 depicts a system that implements protocol and communication abstraction layers for an internet of things, according to some embodiments. The system and devices depicted in FIG. 2 may perform some or all of the processes described herein and illustrated in FIG. 5, in embodiments. The system and devices depicted in FIG. 2 may be configured in accordance with the illustrations and associated descriptions herein (e.g., FIGS. 1A-D). In some embodiments, device management system 132 residing on a network 208 receives data over communication channels 204a-b from devices 222a-b. In some embodiments, devices 222a-b communicate among one another via network 208 while in some embodiments devices 222a-b communication among one another without using network 208. For example, devices 222a-b may communicate via proprietary network or via a local area connection or personal area network separate from network 208 (e.g., via bluetooth or the like). In the depicted embodiment, message modules 203a-b of devices 222a-b may send and/or receive messages and/or data to and from device management system 132 via an interconnectivity module 202a-b. In embodiments, the interconnectivity module 202a-b may include transaction layer or communication layer protocols such as a transaction layer interface 132/134 or Comm layer interface 124. In some embodiments, the interconnectivity module 202a-b may include interconnectivity hardware 111, interconnectivity interface 119 and/or Comm layer interface 124, as described herein.

In some embodiments, device management system 132 includes a device management module 220. The device management module may perform various functionality including verifying an identity of a device (e.g., device 222a-b) or client (e.g., client 136a-b) using a datastore 216 storing data for various authorization schemes. In some embodiments, a client interface 218 coordinates communication of token distribution and command authentication with devices 222a-b over communication channels 204a-b as well as clients 136a-b over communication channels 210a-b.

In some embodiments clients 136a-b (e.g., such as the non-limiting example of business software clients) include client interfaces 212a-b that communicate over communication channels 210a-b to make token requests (e.g., requests for tokens of permission to send authorized commands to devices 222a-b over communication channels 204a-b). In some embodiments clients 136a-b (e.g., such as the non-limiting example of business software clients) include client interfaces 212a-b that communicate over communication channels 210a-b to request data (e.g., requests for sensor reading to devices 222a-b over communication channels 204a-b). Upon receipt of a token request from one of client interfaces 212a-b, device management module 220 compares the received request to a stored authorized requests listed in datastore 216 that are authorized to be fulfilled. If the request from the one of clients 136a-b is authorized to be fulfilled, then device management module sends a token over communication channels 210a-b to client interfaces 212a-b for subsequent use by clients 136a-b in sending commands or requests for data over communication channels 204-b to devices 222a-b.

In some embodiments, device management module 220 can ascertain whether to grant requests for tokens of permission to send authorized commands to devices 222a-b over communication channels 204a-b based on various factors. For example, requests can be considered based on one or a combination of hardware platform identification of clients 136a-b or devices 222a-b, network context of clients 136a-b or devices 222a-b, user identification (logged into associated with clients 136a-b) requests for tokens of permission to send authorized commands to devices 222*a-b* over communication channels 204*a-b*, time of day, type of command, and/or algorithmic risk analysis by token distribution module and the like.

Upon receipt of tokens of permission to send authorized commands or requests to devices 222*a-b* over communication channels 204*a-b*, client interfaces 212*a-b* can send data requests or commands to devices 222*a-b* along with tokens of permission to send authorized data requests or commands to devices 222*a-b* over communication channels 204*a-b*.

Interconnectivity module 202*a-b* of devices 222*a-b* receive commands or requests for data along with tokens of permission to send authorized commands or request data to devices 222*a-b* over communication channels 204*a-b*. Devices 222*a-b* then send token verification requests over communication channels 204*a-b* to device management module 220.

Upon receipt of token verification requests from devices 222*a-b*, device management module 220 verifies that a particular token is currently authorized in association with a particular command or request to a particular one of devices 222*a-b* from a particular one of clients 136*a-b* and sends token verifications over communication channels 204*a-b* indicating permission for clients 136*a-b* to send authorized commands or data requests to devices 222*a-b* over communication channels 204*a-b*.

Upon receipt of token verifications over communication channels 204*a-b* indicating permission for clients 136*a-b* to send authorized commands/requests to devices 222*a-b* over communication channels 204*a-b*, devices 222*a-b* execute the commands or respond to the data request to devices 136*a-b* received over communication channels 204*a-b*.

In some embodiments, devices 222*a-b* send data (e.g., sensor data, business data (e.g., billing or usage data) over network 208 via communication channels 204*a-b* to device management system 132 where the data is stored to data store 216. Various modules of the device management system 132 may access and/or process the data stored in data store 216. For example, visualization module 226 may act as a business process module performing various business processes based on data in the data store. The visualization module 226 may provide various presentation layer services to clients (e.g., clients 136*a-b*) for the data in the data store. For example, visualization module 226 may include applications associated with business processes such as billing, client relationship management, or the like). In another example, decision module 228 may interact with data store 216 to perform various action-enabling capabilities, as described herein.

Figure 3:
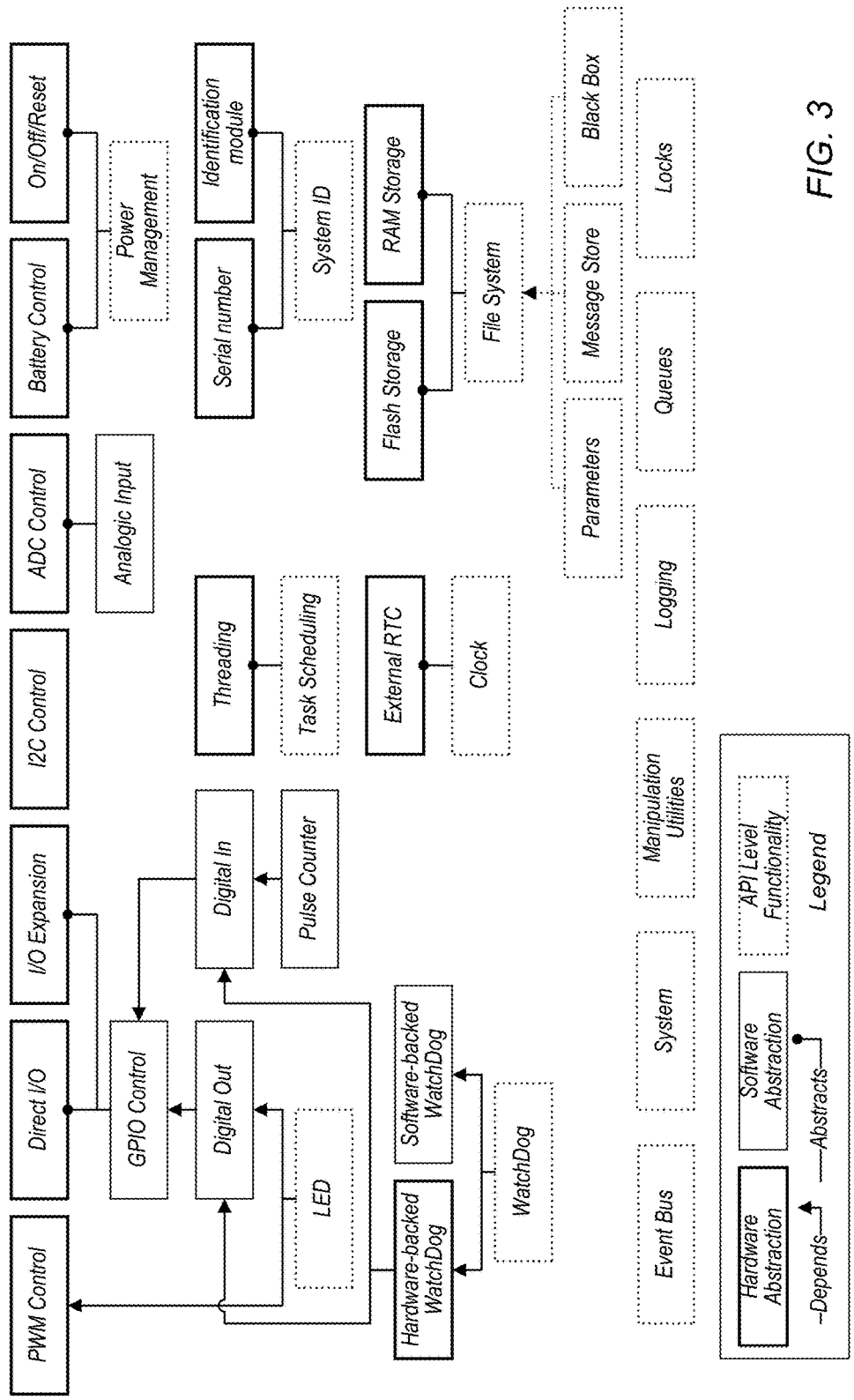
FIG. 3 illustrates objects that implements protocol and communication abstraction layers for an internet of things, according to some embodiments.

FIG. 3 illustrates, at a high level, various modules, components, abstractions, processes, software objects, API level functionality, dependencies, and the like that may be used in development and implementation of a device that implements protocol and communication abstraction layers for an internet of things, according to some embodiments. In the illustrated embodiment, a legend provides an explanation of the symbols used. For example, a box indicating a hardware abstraction is illustrated with a dark box line, a box indicating a software abstraction is indicted with a light solid line and a box indicating API level functionality is indicated with a dotted line. Connectors ending or beginning with an arrow depict dependencies, as in box A depends on box B, while connectors ending or beginning with a dot indicate an abstraction relationship.

Figure 4:
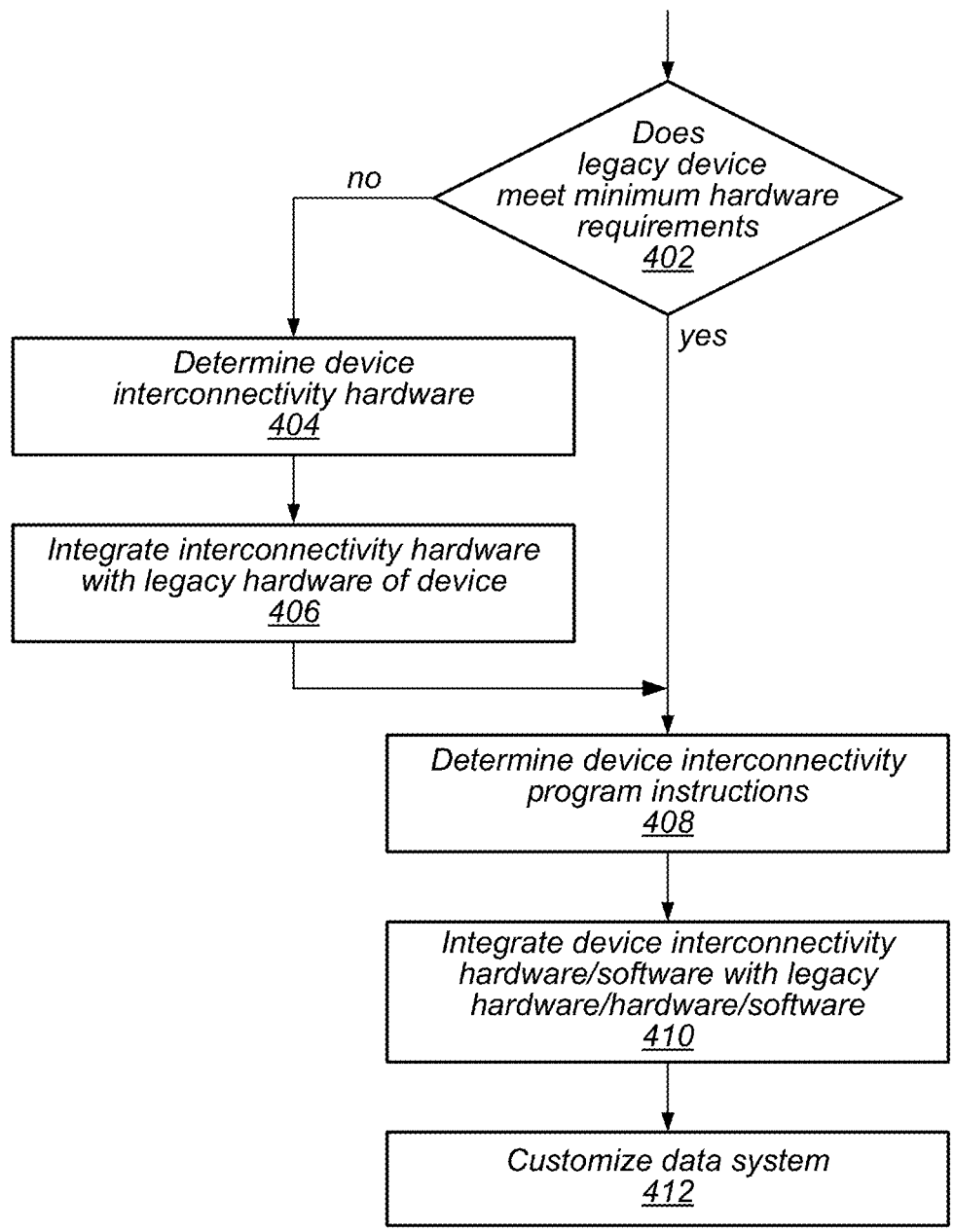
FIG. 4 illustrates a process for converting a legacy device to an interconnected device that is interconnected to an Internet of things, in some embodiments.

FIG. 4 illustrates a process for converting a legacy device to an interconnected device that is interconnected to an Internet of things, in some embodiments. The process may be performed to convert legacy devices without connectivity to devices that can receive and/or transmit data among a network of interconnected devices. For example, the process may facilitate rapid development of interconnectivity for existing devices.

At 402, a determination is made whether the legacy device meets minimum hardware requirements. For example, a determination may be made whether the legacy device is already configured with hardware sufficient to support execution of the interconnectivity hardware intended for the legacy device. If the legacy device does not meet minimum hardware requirements, (402, no) device interconnectivity hardware is determined (block 404). In some instances, interconnectivity hardware may be selected from various firmware providers while in other embodiments, other hardware may be selected. At block 406, interconnectivity hardware is integrated with the legacy hardware of the device. In some instances, the legacy hardware itself may be upgraded to run both the legacy software as well as the interconnectivity software. In some embodiments, interconnectivity firmware is added and integrated with the legacy hardware of the device. In either case (402, yes or no), device interconnectivity program instructions are determined (block 408). For example, various legacy devices may produce various types of data (e.g., status data, usage data, tampering data). Particular interconnectivity software may be configured based on the various types of functionality performed by the legacy device, in embodiments. In some instances, particular interconnectivity software may be configured to interoperate with particular hardware, as described herein.

At block 410, device interconnectivity hardware/software (e.g., firmware) is integrated with legacy hardware/software. For example, instructions from interconnectivity interface 119 and/or Comm layer interface 124 may be used in applications that execute on the device. Block 412 illustrates that a device management system may be customized. For example, device management module 220 may be configured to operate with the legacy functionality of devices 222*a-b* via interconnectivity module 202*a-b* and message module 203*a-b*.

Figure 5:
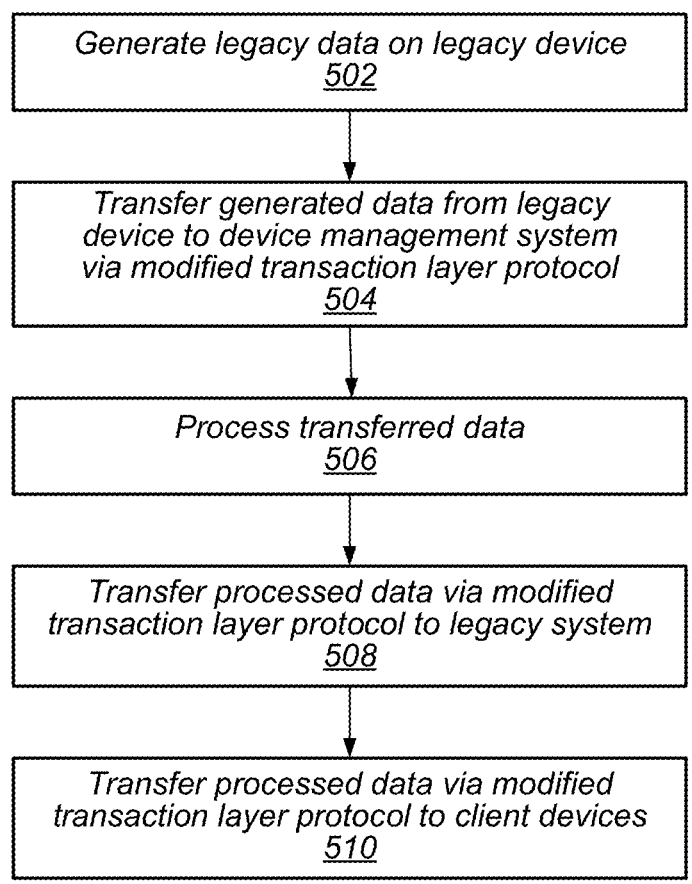
FIG. 5 illustrates a process for transmitting legacy data from a legacy device to client devices via protocol and communication abstraction layers for an internet of things, according to some embodiments.

FIG. 5 illustrates a process for transmitting legacy data from a legacy device to client devices via protocol and communication abstraction layers for an internet of things, according to some embodiments. Various portions of the process may be performed by the various systems and devices described herein (e.g., the systems and devices illustrated in FIGS. 2 and 8).

At 502, legacy data is generated on legacy device. For example, a power meter may generate usage data, a coffee maker may generate status information, a consumer electronics device may generate status information, an appliance may generate any of various data, construction equipment may generate status data, or industrial equipment may generate various or the like. At 504, the generated data is transferred from the legacy device to a device management system (e.g., Device management system 132) via a modified transaction layer protocol (e.g., via transaction interface A 132). Transferred data may be processed, at block 506. For example, data may be processed (e.g., converted, sampled, averaged, or the like) at one layer (e.g., communications layer 120 or transaction layer 130) such that data can be accessed by another layer (e.g., visualization layer 140 or transaction layer, respectively). At block 508, processed data is transferred to a legacy system (e.g., via a modified transaction layer protocol). At block 510 the processed data is transferred from the legacy system via the modified transaction layer protocol to clients (e.g., clients 136a-c).

Figure 6:
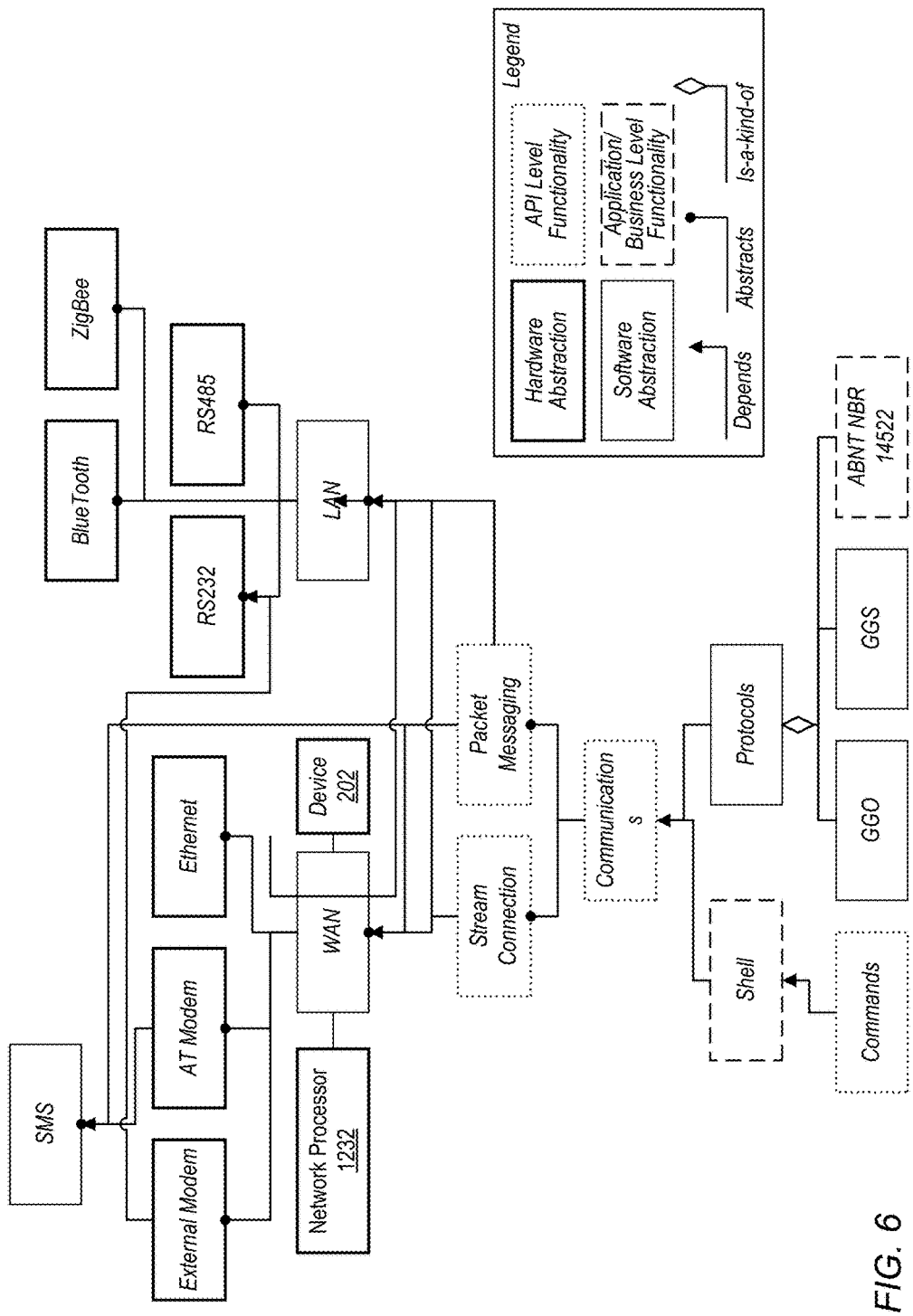
FIG. 6 illustrates various components, functionalities and modes of communication implemented by and supported by the disclosed protocol and communication abstraction layers for an internet of things, according to some embodiments.

FIG. 6 illustrates various components, functionalities and modes of communication implemented by and supported by the disclosed protocol and communication abstraction layers for an internet of things, according to some embodiments.

Figure 7:
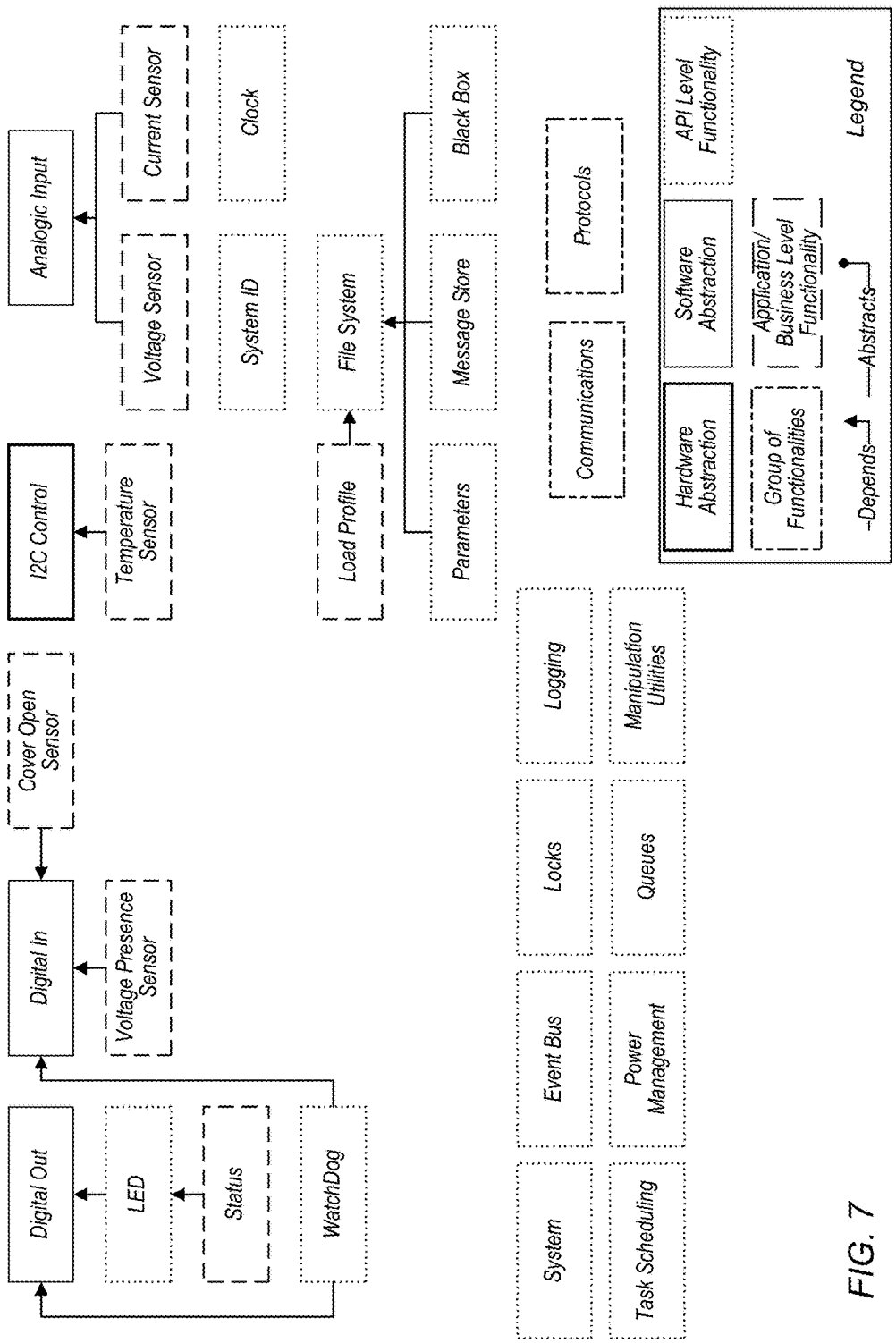
FIG. 7 illustrates abstractions, API level functionality, application/business level functionality, and group functionalities, along with abstraction and dependency relationship that may be used in the development and implementation of a particular device, in accordance with some embodiments.

FIG. 7 illustrates various modes of communication implemented by and supported by the disclosed protocol and communication abstraction layers for an internet of things, according to some embodiments.

In embodiments, the hardware abstractions illustrated in FIGS. 6 and 7 may be abstractions of components of one or more devices (e.g., devices 222a, 222b). Similarly, the illustrated software abstractions may be abstractions of software components of one or more devices (e.g., devices 222a, 222b).

In at least some embodiments, one or more connections may be established between a sensor device (e.g., device 222a) and the device management system 132. For instance, as illustrated in FIGS. 1A-1D, various layers of technology may be organized to facilitate communication between an otherwise non-connected device and a device management system. For example, legacy utility meters generally measure the use of electricity or water etc. But, generally, it is necessary for an agent to visit the meter at some point to read measurements from the meter and report those measurements to an entity that enters the measurements into a system that tracks the usage and bills the client for use of the utility service.

In some instances, it may be preferred to attach to or configure the utility meter with, or create an entirely new meter that can establish one or more connections directly to the entity and/or system such that the measurements are obtained in an automated manner. Such connections may make use of the features illustrated in FIGS. 3, 6 and 7. For instance, in at least some embodiments, a device (e.g., a legacy device may be configured in accordance with the features illustrated herein to provide data to a interconnectivity module (e.g., interconnectivity module 202a) that communicates with device management system 132. The data may be provided over a stream connection or a packet messaging connection (e.g., as illustrated in FIG. 6). The device may also receive requests or instructions from the device management system 132 via the stream connection or packet messaging, in embodiments.

In some instances, the API level functionality, group of functionalities and/or application/business level functionality may be split across a number of devices or systems. For instance, portions of the functionality implemented by the manipulation utilities of FIG. 7 may be implemented across both the device (e.g., device 222a) as well as device management system 132. An administrator may interact with an interface (e.g., a GUI of the device management module 220) of the device management system 132 to manipulate features or characteristics of the device (e.g., device 222a), such as to calibrate a sensor associated with the device or to update software on the device via the manipulation utilities, for example.

In another example, the logging illustrated in FIG. 7 may include the device (e.g., 222a) generating data and sending the data to device management system 132 that stores the generated data in a datastore (e.g., datastore 216).

In at least some embodiments, various portions of the illustrations in FIGS. 6 and 7 may be implemented by the device management system 132, or by clients (e.g., 136a, 136b) without departing from the scope of the invention.

FIG. 7 illustrates abstractions, API level functionality, application/business level functionality, and group functionalities, along with abstraction and dependency relationship that may be used in the development and implementation of a particular device, in accordance with some embodiments. In the illustrated embodiment, a legend provides an explanation of the symbols used. For example, a box indicating a hardware abstraction is illustrated with a dark box line, a box indicating a software abstraction is indicted with a light solid line, a box indicating API level functionality is indicated with a dotted line, a box indicating a group of functionality is depicted with a blended dotted/dashed line and a box indicting Application/Business level functionality is depicted with a dashed line. Connectors ending or beginning with an arrow depict dependencies, as in box A depends on box B, while connectors ending or beginning with a dot indicate an abstraction relationship.

Figure 8:
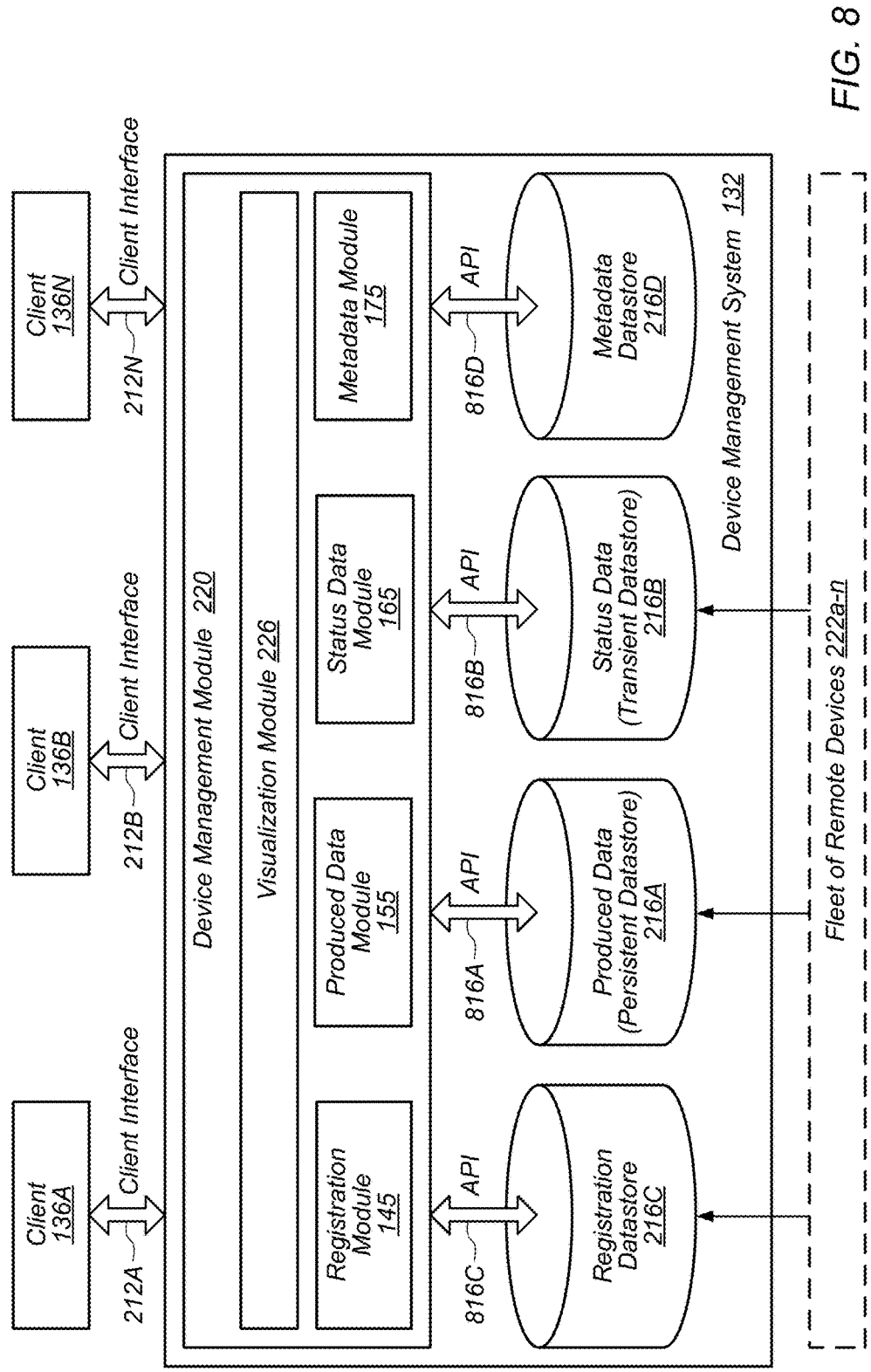
FIG. 8 illustrates a system with multiple types of datastores for performing at least some of the functionality described herein, in accordance with some embodiments.

FIG. 8 illustrates a system with multiple types of datastores (e.g., SQL and Non SQL datastores) for performing at least some of the functionality described herein, in accordance with some embodiments. In the illustrated embodiment, the datastores may be populated with data transmitted from the devices (e.g., from the fleet of remote device 222a-n) or with data from the device management system (e.g., data based on analysis performed by the device management system 132).

Datastores and Associated APIs

In the illustrated embodiment, the device management system 132 is illustrated with a persistent data store 216A that is configured to store data produced by devices (e.g., devices 222a-n). The persistent datastore 216a may be part of a network-based server that implements the device management system, in embodiments. The device management system 132 is also illustrated with a transient datastore that is configured to store status data for devices (e.g., devices 222a-n).

The datastores 216A-D are illustrated with corresponding APIs 816A-D that comprise various data access libraries (e.g., APIs). The individual APIs may be similar, customized or proprietary, in embodiments. For instance, the device management system 132 may be implemented as business logic computer instructions on a server with a number of APIs that are each tailored to interact with datastores that are tuned to the particular type of data stored therein.

Some APIs may be configured with library operations to create, read, update and/or delete (CRUD) the data in the datastores. However, some APIs or datastore implementations may be configured to perform better at some of these operations. For example, in some embodiments the registration API may be particularly configured to emphasize creation and retrieval of registration data over updating. In another example the datastore for the status data may be configured to emphasize updates and reads over create and delete.

In some embodiments, the various datastores may be implemented via some combination of hardware and/or software that is particularly suited to the type of data being stored or to the amounts of requests received or to the amount of data stored to the datastore. For example, status data from the device (e.g., remote devices 222a-n) may be configured to receive a large number of updates In embodiments, the persistent datastore 216A may be optimized for production data. For instance, the datastore may not readily support updates or deletions to the data it stores.

One or more of the datastores (e.g., the persistent datastore 216a or the status datastore 216B) may be particularly configured as a time-series database (TSDB), for instance. For example, software may be optimized for handling time series data, arrays of numbers indexed by time (e.g., a datetime or a datetime range). In some fields these time series are called profiles, curves, or traces. A time series of stock prices might be called a price curve. A time series of energy consumption might be called a load profile. A log of temperature values over time might be called a temperature trace, in embodiments. Time series data may include physical measurements, in embodiments. For example, measurements of temperature, of electricity use, of water use, etc. In some embodiments the time series data may include a device id, time stamp, a variable and a value. The data may be sent as tags, in embodiments. In embodiments the device id may be an indirect reference to the device, for example, an id of the room the device is in or some other physical attribute associated with the device that provides a unique identification.

Software with complex logic or business rules and high transaction volume for time series data may not be practical with traditional relational database management systems. Flat file databases may not be a viable option either, if the data and transaction volume reaches a maximum threshold determined by the capacity of individual servers (processing power and storage capacity). Queries for historical data, replete with time ranges and roll ups and arbitrary time zone conversions may be difficult in a relational database. Compositions of those rules may be even more difficult, in embodiments. In some instances, this is a problem compounded by the free nature of relational systems themselves. For example, some relational systems are not modelled correctly with respect to time series data. TSDBs on the other hand impose a model and this allows them to provide more features for doing so.

In some embodiments, one or more of the datastores (e.g., the persistent datastore 216a or the status datastore 216B) may use an in-memory database (IMDB; also main memory database system or MMDB or memory resident database) which is a database management system that primarily relies on main memory for computer data storage. It is contrasted with database management systems that employ a disk storage mechanism. Main memory databases may be faster than disk-optimized databases. For example, the internal optimization algorithms may be simpler and execute fewer CPU instructions. Accessing data in memory may eliminate seek time when querying the data, which may provide faster and more predictable performance than disk, in embodiments.

Applications where response time is critical, such as those running telecommunications network equipment and mobile advertising networks, often use main-memory databases.

In some embodiments, at least one of the datastores may be in RAM and one of the other datastores may be on a hard-disk. For example, the status datastore 216B may be in RAM and the produced datastore 216A may be on a hard-disk of the server, or vice versa. In some embodiments the status datastore is the more recent time-series data stored in RAM so that the status data can be stored and obtained more quickly than the historical time-series data that is not in RAM. For example, when new time-series data is received from a remote device, the prior value may immediately be updated/overwritten in RAM and then the new entry is created in the production datastore [as well] that is distinct from the datastore in RAM. In some embodiments, the production data store may be configured or optimized to only create new values for entries and/or to not delete or update values for entries. In some embodiments, the registration and/or status datastores may be optimized or configured to only update and delete existing values for entries and not create new entries (other than when an entire new device is added, for which an entirely new entry would be added). In some embodiments, a system arranged as described herein may provide real-time status information (real-time with reference to the request for the data) as well as providing archived data at a somewhat slower rate in comparison the real-time status data.

Device Management Modules

The various module of the device management module 220 are depicted as being associated with respective datastores. For example, the registration module 145 is associated with the registration datastore 216C. The registration module may include business logic associated with and particular configured to operate on the registration data. Similarly, the produced data module 155 may include business logic that is particularly tailored to retrieve or operation on the produced data 216A and the status data module may be particularly configured to retrieve or update the status data. In embodiments, the metadata module 175 may be particularly tailored to use the metadata to automatically populate displays for clients 136A-N with the corresponding data from the produced data or status data datastores.

FIG. 8 also illustrated that device management system 132 may be configured with a datastore for registration data (e.g., 216C) and/or a datastore for metadata (e.g., 216D). The registration datastore 216C may store registration data, such as device registration data (registration data associated with and/or stored on the device, at the time of manufacture or later for example). The registration datastore may be an XML database, in embodiments. The registration datastore may store registration data in a datastore distinct from other datastores in the system. In some embodiments the registration data may include information associated with the device at the time of manufacture or later. Registration data may also include provisioning data. For example provisioning data for a device may associate the device with an entity such as a particular network, network provider, client, customer or the like). In some embodiments the device may be particular configured with technology that is particular to the entity. Various different fleets of devices may be associated with respective entities, in embodiments.

The external storage of the registration metadata may facilitate automation of presentation of the data without additional coding, in embodiments. For example, web page templates may be predefined based upon the metadata in metadata repository 216D such that when the datastore is populated with produced or status data, corresponding web pages are readily available, without having to generate additional code to present the data.

Templates may be defined and stored in the metadata repository 216D. Templates may be defined by device type, by entity, or using some other grouping scheme. The templates may make use of any of various organizational strategies such as class-nested attributes or the like, for example. For example, the system may provide for receiving a name for a type of device and respond by returning known fields for that particular device.

The metadata datastore 216D may include any of various types of metadata such as but not limited to address string, meter number string, precision float, etc. In some embodiments, the behavior of the system may be changed via changes to the metadata.

FIG. 8 illustrates clients 136A-N and respective client interfaces 212A-N. Clients generally make requests to device management system 132 and device management system 132 generally responds to those requests by providing data from the datastores (e.g., datastores 216A/B). In some embodiments, the device management system 132 may process that data prior to providing the data to the clients 136A-N. For example, the visualization module 226 may analyzed the data in the datastores and output results from the analysis or store the results to a datastore, for later retrieval.

Figure 9:
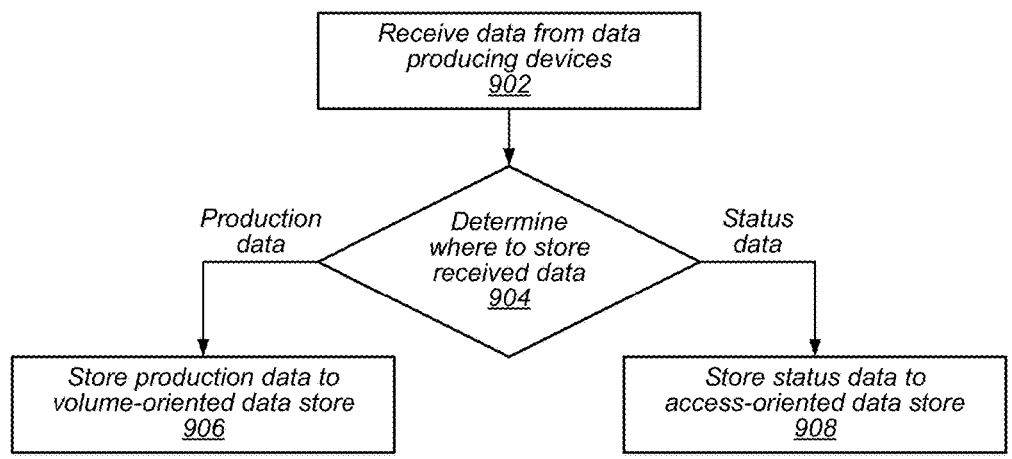
FIG. 9 is a block diagram that illustrates a process for storing data, in accordance with some embodiments.

FIG. 9 is a block diagram that illustrates a process for storing data, in accordance with some embodiments. The process illustrated in FIG. 9 may be performed by one or more components of the device management system 132. At block 902, data is received from data producing devices (e.g., one or more devices of the fleet of devices 222*a-n*). The data may be production data, status data, or registration data or some combination thereof. The data may be received over one or more channels (e.g., one of the channels depicted in FIG. 6, such as the stream connection or the packet messaging). The data may be received via the one or more layers depicted in FIGS. 1A-1D, in embodiments. For instance, the data may be received from the messaging module 203*a* of device 222*a* via connection 204*a* of FIG. 2.

At block 904, a determination is made where to store the received data. For example, the device management system may receive the data, determine that the data is either production data or status data and determine to store the data in the corresponding data store. In another embodiment, the data may be received from the devices 222*a-n* with metadata that tells the system where to store the data and the device management system may store the data as directed.

Block 906 illustrates that production data is stored to a volume oriented datastore (e.g., persistent datastore 216A) and block 908 illustrates that status data is stored in a transient data oriented datastore (e.g., transient datastore 216B).

Figure 10:
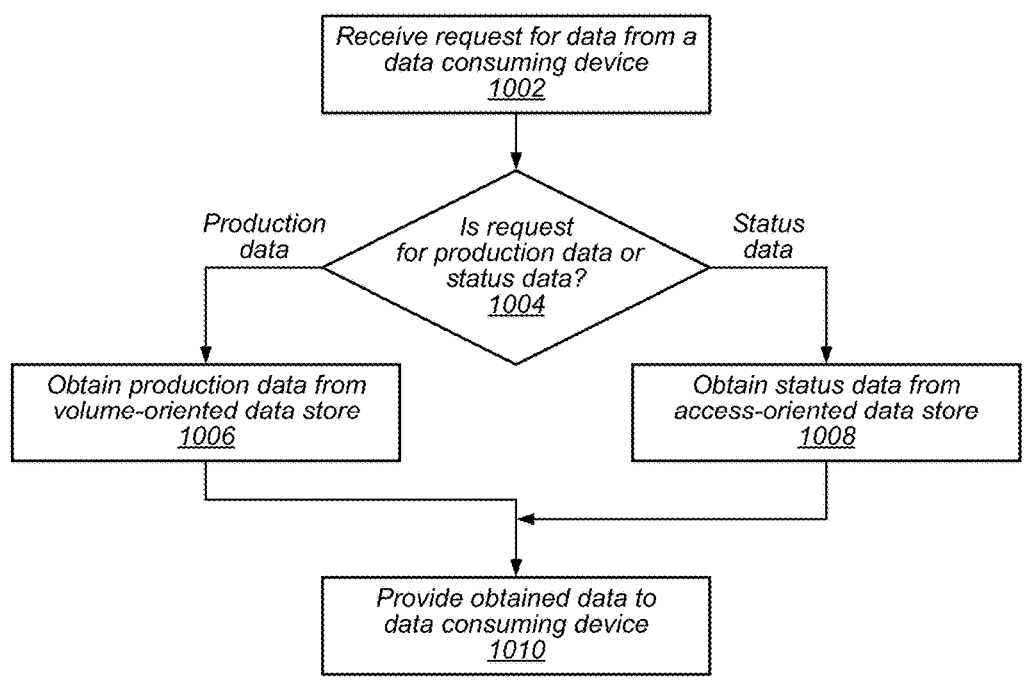
FIG. 10 illustrates a block diagram that illustrates a process for responding to requests by providing data from various sources, in accordance with some embodiments.

FIG. 10 illustrates a block diagram that illustrates a process for responding to requests by providing data from various sources, in accordance with some embodiments. The illustrated process may be performed by one or more components of the device management system 132, in embodiments.

Requests for data are received from a data consuming device (block 1002). For instance, the visualization module 226 may receive a request for data from client 136A. A determination may be made whether the requested data is production data or status data (block 1004). For instance, the visualization module may determine the type of requested data or may be instructed what the type of requested data is (e.g., from metadata in the request). For requests for production data, the production data is obtained from the volume-oriented data store (block 1006). For requests for status data, the status data is obtained from the access-oriented data store (block 1008). In either case, the data is provided back to the requesting data consuming device (block 1010). For example, visualization module 226 may send the data over communication link 210*a* to client 136A.

Figure 11:
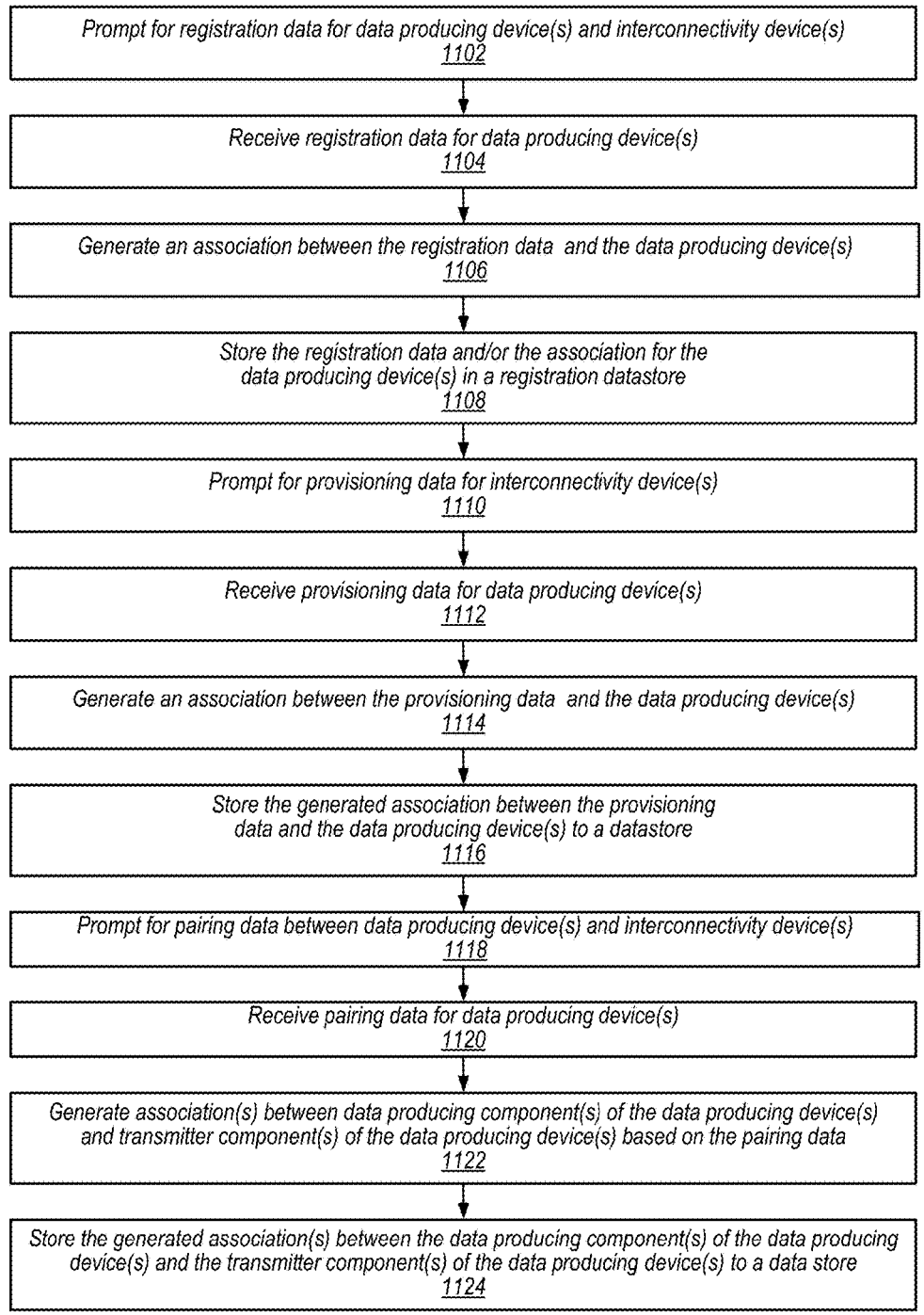
FIG. 11 illustrates a flow diagram of a process implemented by components of the system described herein, in embodiments.

FIG. 11 illustrates a flow diagram of a process implemented by components of the system described herein, in embodiments. The process may be performed by one or more components of the device management system 132.

At 1102, the system may prompt for registration data for data producing devices. For example, the system may instruct display of one or more interface elements to an administrator or other user to enter registration data, or the system may query the device directly for registration data, or the system may receive registration data from the device based on some initialization sequence.

At 1104 registration data for the data producing devices is received (e.g., via the user interface or via one or more communication channels over network 204). An association between the registration data the data producing devices is generated (block 1106). Block 1106 illustrates that the registration data and/or the associating data for the data producing devices are stored in a registration datastore (e.g., registration datastore 216C).

FIG. 11 illustrates that there may be a prompt for provisioning the data for the data producing devices (1110). For instance, various interface elements may be generated by the device management module 220 prompting a user to enter provisioning data that associates the device with a particular entity. At 1112, the provisioning data may be received. For example, an administrator may enter the information into a user interface GUI generated by the device management system. An association between the provisioning data and the data producing device is generated (1114) and stored to a datastore (1116). For instance, the device management system 132 may generate the association and store the association to registration datastore 216C.

At block 1118, FIG. 11 illustrates that there may be a prompt for pairing data for data producing devices. For example, the device management system may instruct generation of one or more graphic user interface elements to display to an administrator that prompt the administrator to enter pairing information that associates legacy hardware 117 with interconnectivity hardware 111 of FIG. 1C. In some embodiments, the device itself 222*a* may send the pairing information to the device management system 1320 (e.g., over network 208 via message module 203*a*.

The pairing information is received (block 1120) and an association is generated between a data producing component of the data producing device (e.g., a sensor and/or legacy hardware 117) and transmitter components (interconnectivity hardware 111) of the data producing devices based on the pairing data (block 1122). The generated associations are stored to a datastore (block 1124). For example, the data may be stored to registration datastore 216C.

Figure 12:
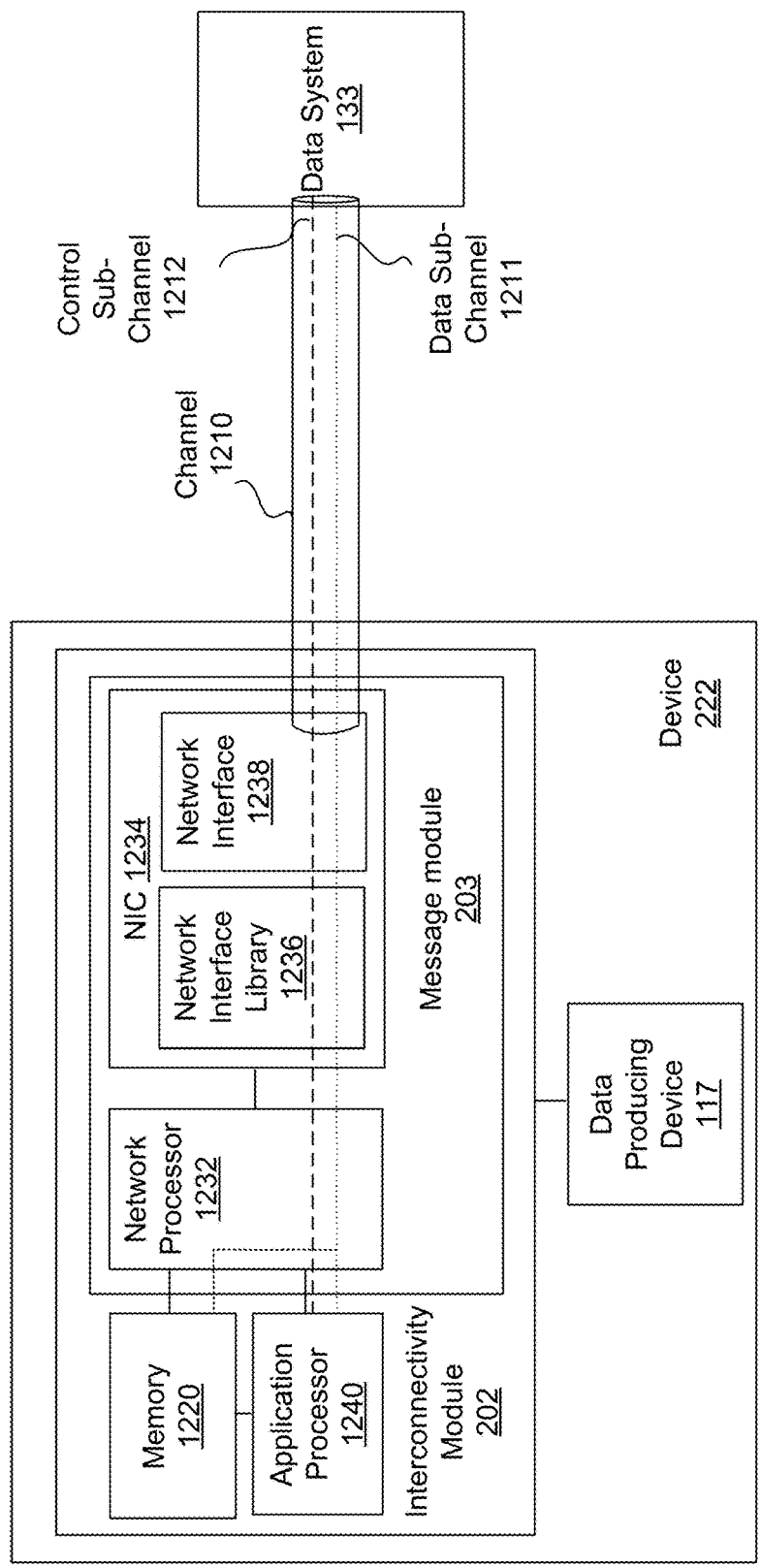
FIG. 12 illustrates a device that is remote from a data system, according to some embodiments.

FIG. 12 illustrates an embodiment where device 222 is remote from data system 133. The device 222 is illustrated as communicatively coupled to data system 133 via channel 1210. The channel 1210 is illustrated as being logically divided into a control sub-channel 1212 and a data sub-channel 1211. Physical division of the sub-channels is also contemplated in some embodiments.

Device 222 is illustrated with data producing device 117 and interconnectivity module 202. In some embodiments, data producing device is a device that produces data, such as, but not limited to consumer electronics, sensors (e.g., utility sensors or otherwise), wireless drones, or any other device that produces data, without exclusion. The FIGs. have been simplified in order to clarify the subject matter. More or fewer components/subcomponents and or submodules of the device are contemplated, in embodiments.

Interconnectivity module 202 is illustrated with message module 203, memory 1220, and application processor 1240. In embodiments, interconnectivity module 202 is configured as an intermediary communication device. For example, interconnection module 202 may be configured to translate the data from the data producing device into a form for transmission via the channel 1210. In another example, interconnection module 202 may be configured to facilitate communication between an otherwise isolated data producing device and a data system such as data system 133.

In embodiments, application processor 1240 may be a programmable logic controller, or programmable logic device, field-programmable gate array or the like. In some embodiments application processor 1240 may be a computer processor configured to execute application instructions stored in memory 1220. In some embodiments, the application processor 1240 executes an application that receives and processes data (e.g., logs the data) from the data producing device 117.

Message module 203 is illustrated with network processor 1232 and MC 1234. Various arrangements of these components operate to connect the application processor 1240 and/or the memory 1220 to the data system via channel 1210.

In some embodiments, one or more of the components of the message module may be swapped out for other similar components without disrupting the system. For example, the network interface library may include support for a number of different libraries that support various different network processors and/or network interfaces. For instance, the message module 203 may be configured with a network interface library 1236 and network interface 1238 that are configured to accept various different alternative network processors without reprogramming the MC or other components of the message module.

As illustrated in FIG. 12, device 222 and data system 133 are communicatively coupled via channel 1210. Channel 1210 may be a wired or wireless single channel communication channel, in embodiments. In some embodiments, some or all of interconnectivity module 202 may be configured to emulate distinct control and data channels over a single channel environment of channel 1210. For instance, message module 203 may implement or provide a control sub-channel for transmission of the control information and transmit one or more control instructions via the control sub-channel. Message module 203 may also implement or provide a data sub-channel for transmission of the logged data, and transmit the logged data via the data sub-channel. In embodiments, the control sub-channel and the data sub-channel are distinct sub-channels within the single channel environment.

In embodiments, the single channel environment is a TCP/IP environment, and to provide distinct control and data sub-channels, the network platform assigns a distinct port to each of the control and data sub-channels.

In embodiments, the single channel environment is a serial environment; and to provide distinct control and data sub-channels, the network platform implements a communication layer protocol between a transaction interface of the single channel environment and an interconnectivity interface of the application platform.

Figure 13A:
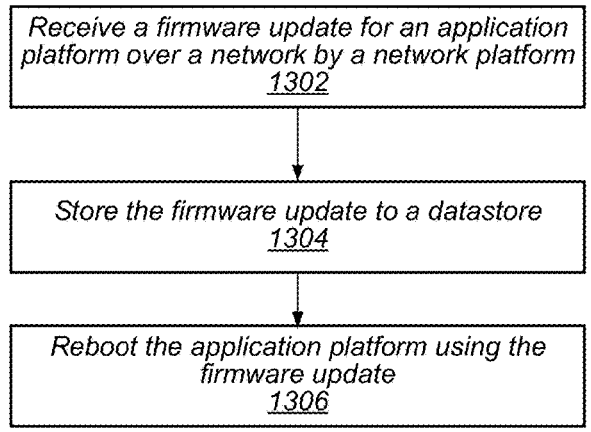
FIG. 13A is a flow diagram illustrating a firmware update process for a remote device.

FIG. 13A is a flow diagram for a firmware update process for a remote device (e.g., device 222). In the illustrated embodiment, the device is configured to receive a firmware update for an application platform over a network by a network platform (block 1302). Block 1304 illustrates that the firmware may be stored to a datastore (e.g., memory 1220). In the illustrated embodiments, the application platform is rebooted using the firmware update (block 1306).

Figure 13B:
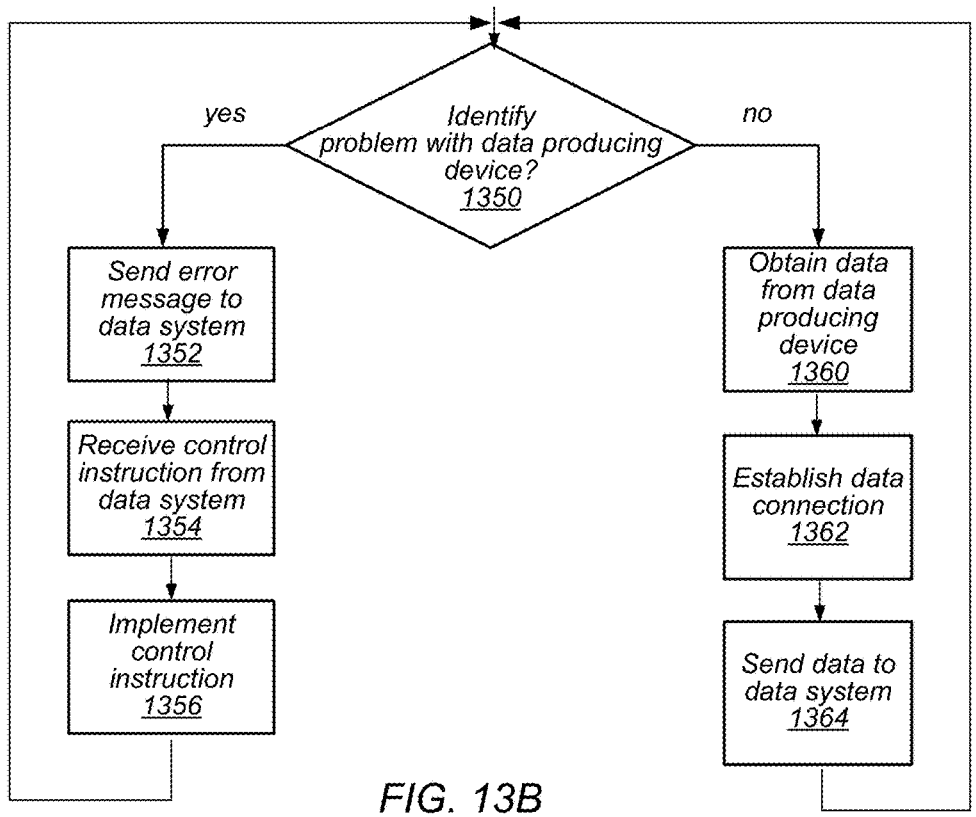
FIG. 13B is a flow chart illustrating a process for identifying a problem with a data producing device.

FIG. 13B is a flow chart illustrating a process for identifying a problem with a data producing device. At 1350, a determination whether a problem with a data producing device is made. For example, expected data may have not been received by the application processor 1240 or by the data system 133, or unexpected data (e.g., incorrect or corrupt data) may have been received. If no problem is detected, data is obtained from the data producing device (block 1360). A data connection may be established (block 1362) and data may be sent to the data system (block 1364).

If a problem is identified, an error message may be sent to the data system (block 1352). A control message may be received from the data system (e.g., by the remote device 222). The control instruction may be implemented by the remote device (block 1356). For example, the control instruction may instruct (via the control channel) deployment of new firmware and the remote device 222 may obtain or receive the firmware (e.g., via the data channel) and install the firmware, as described herein, in embodiments.

Embodiments of the disclosure can be described in view of the following clauses:

Clause 1. A system, comprising:
a plurality of data producing devices configured to register with a registration component, and transmit produced data to a control process;
one or more hardware processors, and memory comprising program instructions that are executed by the one or more hardware processors to implement:
a registration component configured to:
process, via registration interface, registration requests received from the control process; and
store registration data, wherein the registration data is for the plurality of data producing devices;
a control process configured to:
receive the produced data from the plurality of data producing devices and direct the produced data to at least one of a plurality of datastores;
receive requests from one or more requesting devices;
determine responses to the requests based at least in part on requests that the control process directs to one or more components via a plurality of different interfaces; and
transmit responses to the one or more requesting devices;
a volume-oriented data component configured to:
process, via volume-oriented data interface, volume-oriented requests received from the control process; and
store volume-oriented data in a volume-oriented datastore, wherein the volume oriented data is produced by the plurality of data producing devices; and
a status component configured to:
process, via a status interface, status requests received from the control process; and
store status data in an access-oriented datastore, wherein the status data is a most recent data produced by the data producing devices;
wherein one or more of the registration component, volume-oriented data component or status component is implemented at least in part via transient memory datastore, and wherein one or more of the registration component, volume-oriented data component or status component is implemented at least in part via persistent memory datastore.

Clause 2. The system of clause 1, wherein the volume-oriented datastore is implemented via non-volatile memory, and wherein the access-oriented data store is implemented via volatile memory such that the volume-oriented datastore is configured to service a larger volume of data requests than the access-oriented data store, and such that the access-oriented data store is configured to provide data to the control process with less latency than the volume-oriented datastore.

Clause 3. The system of any of clauses 1, wherein the volume-oriented datastore comprises a time series datastore; and wherein the access-oriented datastore comprises an in-memory datastore.

Clause 4. The system of any of clauses 1-3, further comprising:
a metadata datastore comprising a number of different predefined data types for a corresponding number of different types of devices;
and a metadata module comprising program instructions that are executed by the one or more processors to:
receive instructions that associate a particular data producing device with a particular predefined type of device defined by metadata in the metadata datastore.

Embodiments of the disclosure can be described in view of the following clauses:

Clause 5. A method comprising:
receiving over a data network, from a remote device and by a control process comprising executable instruction that are executed by one or more hardware processors of the one or more computing devices, a request for a plurality of types of data, the requested types of data including:
produced data produced by one or more other remote devices and stored to a volume-oriented datastore, and
status data produced by the one or more other remote devices and stored to an access-oriented datastore;
obtaining, by the control process, the requested type of data, obtaining including:
obtaining produced data from a volume oriented datastore via a volume-oriented interface, wherein the volume-oriented datastore is implemented via persistent memory, and
obtaining status data from an access-oriented data store via an access-oriented interface, wherein the access-oriented data store is implemented via transient memory such that the access-oriented data store is configured to provide data to the control process with less latency than the volume-oriented datastore; and
transmitting, responsive to said receiving the request, the produced data and the status data over a data network to the remote device that requested the data.

Clause 6. The method as recited in clause 5, further comprising:
storing non-displayable data from another remote device, wherein the non-displayable data from the other remote device is stored in a data store, but is not available for display to a display device;
associating the non-displayable data from the other remote device with predefined metadata, wherein associating the non-displayable data with the predefined metadata causes the non-displayable data to be displayable data available for display to the display device;
receiving a request for display of the displayable data associated with the other remote device; and
providing the associated displayable data for display to a display device.

Clause 7. The method as recited in any of clauses 5-6, wherein the predefined metadata includes predefined templates for particular types of devices, and wherein said associating the non-displayable data from the other remote device with predefined metadata includes associating the non-displayable data with a particular one of the predefined templates.

Clause 8. The method as recited in clause 7, wherein the predefined templates include class-nested attributes for particular types of devices.

Clause 9. The method as recited in clause 8, wherein said providing the associated displayable data for display to the display device includes providing the data associated with one or more of the class-nested attributes associated with the other remote device, and wherein the data associated with one or more of the class-nested attributes is displayed in accordance with predefined display logic associated with the predefined metadata.

Clause 10. The method as recited in any of clauses 5-9, wherein the remote device includes a display device configured to display the plurality of types of data, the method further comprising:
receiving, by the remote display device, the produced data and the status data; and
displaying, by the remote display device, the produced data and the status data.

Clause 11. The method as recited in any of clauses 5-10, wherein the one or more other remote devices includes a fleet of distributed data producing devices, the method further comprising:
receiving produced data and status data from the fleet of distributed data producing devices;
storing the received produced data in the volume-oriented datastore; and
storing the received status data in the access-oriented datastore.

Clause 12. The method as recited in clause 11, the method further comprising:
prior to a given device of the fleet of distributed data producing devices sending the produced data,
passing produced data from legacy hardware of the given device to interconnectivity hardware of the given device via an interconnectivity interface of the given device, wherein the legacy hardware includes sensor hardware for obtaining the produced data from one or more sensors of the given device, and wherein the interconnectivity interface is configured to interconnect the legacy hardware with interconnectivity firmware such that the produced data generated via the one or more sensors of the given device is transmitted from the legacy hardware to the control system.

Embodiments of the disclosure can be described in view of the following clauses:

Clause 13. A non-transitory computer-readable medium comprising program instructions that are executed by one or more hardware processors to implement:
a control module configured to:
receive requests from one or more requesting devices;
determine responses to the requests based at least in part on requests that the control module directs to a plurality of different components via a plurality of different interfaces, wherein the plurality of different interfaces include:
a registration interface configured to interface with a registration component that receives and responds to registration requests, and stores registration data;
a volume-oriented data interface configured to interface with a volume-oriented data component that processes volume-oriented requests, and stores volume-oriented data; and
a status interface configured to interface with a status component that processes status requests, and stores status data; and
transmit responses to the one or more requesting devices, wherein the responses are based at least in part on the requests that the control module directs to the plurality of different components via the plurality of different interfaces; and wherein one or more of the registration component, volume-oriented data component or status component is implemented at least in part via transient memory datastore, and wherein one or more of the registration component, volume-oriented data component or status component is implemented at least in part via persistent memory datastore.

Clause 14. The non-transitory computer-readable medium of clause 13, wherein the program instructions that are executed by the one or more hardware processors are further configured to:

store non-displayable data from another remote device, wherein the non-displayable data from the other remote device is stored in a data store, but is not available for display to a display device;

associate the non-displayable data from the other remote device with predefined metadata that was predefined before the non-displayable data was received, wherein associate the non-displayable data with the predefined metadata causes the non-displayable data to be displayable data available for display to the display device;

receive a request for display of the displayable data associated with the other remote device; and provide the associated displayable data for display to a display device.

Clause 15. The non-transitory computer-readable medium of any of clauses 13-14, wherein the predefined metadata includes predefined templates for particular types of devices, and wherein to perform said associate the non-displayable data from the other remote device with predefined metadata, the program instructions are further configured to associate the non-displayable data with a particular one of the predefined templates.

Clause 16. The non-transitory computer-readable medium of clause 15, wherein the predefined templates include class-nested attributes for particular types of devices.

Clause 17. The non-transitory computer-readable medium of clause 16, wherein to provide the associated displayable data for display to the display device, the program instructions are further configured to provide the data associated with one or more of the class-nested attributes associated with the other remote device, and wherein the data associated with one or more of the class-nested attributes is displayed in accordance with predefined display logic associated with the predefined metadata.

Clause 18. The non-transitory computer-readable medium of any of clauses 13-17, wherein the program instructions that are executed by the one or more hardware processors are further configured to pair the one or more other remote devices to respective measurement devices, the respective measurement devices configured to generate measurements, the one or more other remote devices configured to receive the measurements from the respective measurement devices and transmit the measurements over a data network for storage in a datastore.

Clause 19. The non-transitory computer-readable medium of any of clauses 13-18, wherein to pair the one or more other remote devices to respective measurement devices, the program instructions that are executed by the one or more hardware processors are further configured, for each of the one or more other remote devices, to:

instruct display of interface elements that prompt for entry of a respective association;

receive via interface elements, the respective association; and store an indication of the respective association to pair the respective device with the respective remote device.

Clause 20. The non-transitory computer-readable medium of any of clauses 13-19, wherein the program instructions that are executed by the one or more hardware processors are further configured to:

register the one or more other remote devices; and
provision the one or more other remote devices.

Example System

Figure 14:
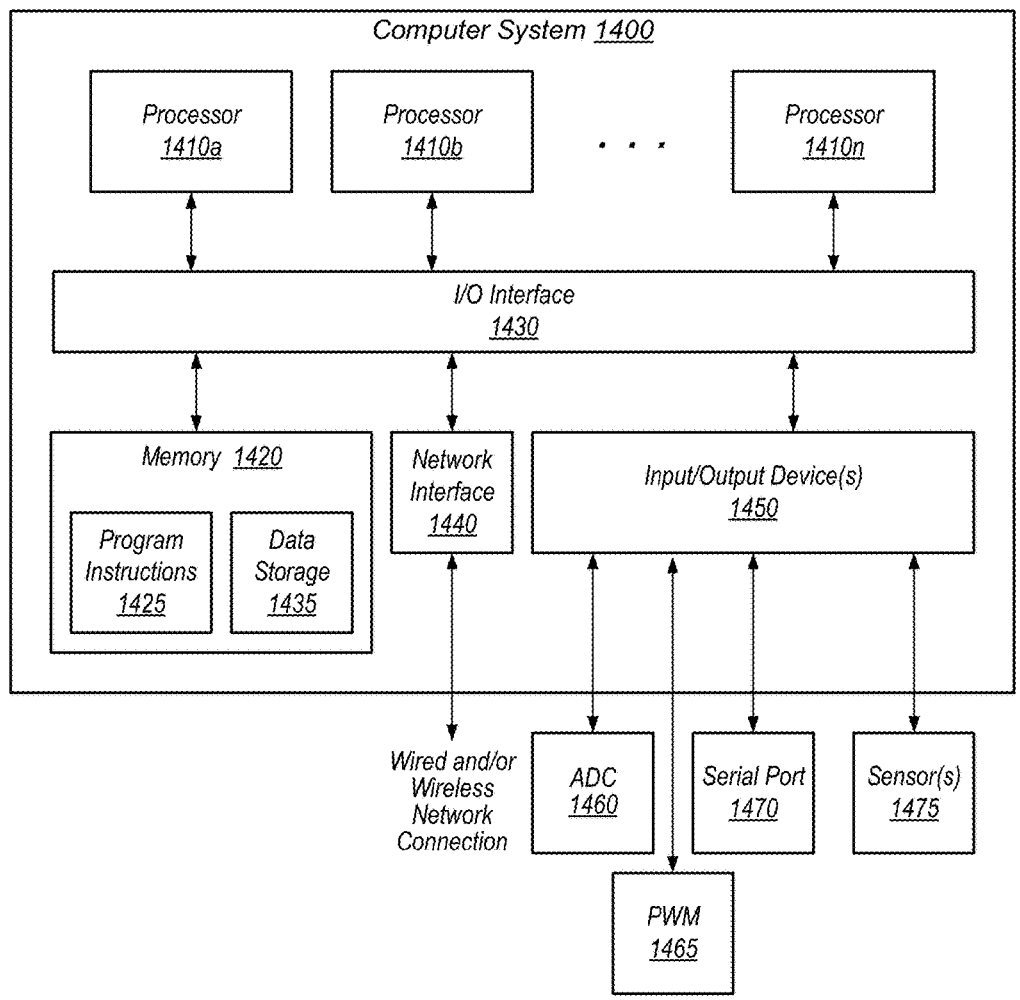
FIG. 14 illustrates an example computer system that may be used in embodiments for implementing protocol and communication abstraction layer, abstracting protocols and communication networks for internet of things systems, in accordance with some embodiments.

Embodiments of a system, devices and methods that use a protocol and communication abstraction layer for abstracting protocols and communication networks for internet of things systems, as described herein, may be executed on one or more computer systems, which may interact with various other devices. One such computer system is illustrated by FIG. 14. In different embodiments, computer system 1400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1460, such as cursor control device 1460, keyboard 1470, and display(s) 1480. In some embodiments, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions and/or data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a transaction management module are shown stored within system memory 1420 as program instructions 1425 and data storage 1435, respectively. In other embodiments, program instructions and/or data may be received, sent or stored upon different types of computer-accessible media or on similar media separate from system memory 1420 or computer system 1400. Generally speaking, a computer-accessible medium may include storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440.

In one embodiment, I/O interface 1430 may be configured to coordinate I/O traffic between processor 1410, system memory 1420, and any peripheral devices in the device, including network interface 1440 or other peripheral interfaces, such as input/output devices 1460. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1460 may, in some embodiments, include one or more display terminals, keyboards, keypads, touchpads, scanning devices, voice or optical recognition devices, or any other devices suitable for entering or retrieving data by one or more computer system 1400. Multiple input/output devices 1460 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1425, configured to implement embodiments of a device management module or interconnectivity module as described herein, and data storage 1435, including various data accessible by program instructions 1425. In one embodiment, program instructions 1425 may include software elements of embodiments of a device management module or interconnectivity module, as illustrated in the above Figures. Data storage 1435 may include data that may be used in embodiments. In other embodiments, other or different software elements and data may be included.

Those skilled in the art will appreciate that computer system 1400 is merely illustrative and is not intended to limit the scope of device management module or interconnectivity module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In various embodiments, the modules or components may be implemented via some combination of hardware, and program instructions that, when executed by one or more processors, perform the described functionality.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:

1. A system comprising:
an application platform that includes application memory and one or more application processors, wherein the application memory includes instructions that are executed by the one or more application processors to:
obtain data from a data producing device; and
log the obtained data; and
a network platform that includes network platform memory and a network platform processor, wherein the network platform memory includes instruction that are executed by the one or more network platform processors to:
emulate distinct control and data channels in a single channel environment, wherein said emulate distinct control and data channels includes:
in a single channel environment,
provide a control sub-channel for transmission of the control information;
transmit one or more control instructions via the control sub-channel;
provide a data sub-channel for transmission of the logged data; and
transmit the logged data via the data sub-channel;
wherein the control sub-channel and the data sub-channel are distinct sub-channels within the single channel environment.

2. The system as recited in claim 1,
wherein the single channel environment is a TCP/IP environment; and
wherein to provide distinct control and data sub-channels the network platform is configured to assign a distinct port to each of the control and data sub-channels.

3. The system as recited in claim 1,
wherein the single channel environment is a serial environment; and
wherein to provide distinct control and data sub-channels the network platform is configured to implement a communication layer protocol between a transaction interface of the single channel environment and an interconnectivity interface of the application platform.

4. The system as recited in claim 1, wherein the network platform is configured to receive a firmware update for the application platform over a network.

5. The system as recited in claim 4, wherein the network platform is further configured to store the firmware update to a datastore.

6. The system as recited in claim 5, wherein the network platform is further configured to reboot the application platform using the firmware update.

7. A non-transitory computer-readable medium comprising program instructions that are executable by one or more processors to perform:

emulating distinct control and data channels in a single channel environment between an interconnectivity module and a device management system, wherein emulating includes:
providing a control sub-channel for transmission of control information in a single channel environment;
transmitting control information via the control sub-channel within the single channel environment;
providing a data sub-channel for transmission of data obtained from a data producing device by the interconnectivity module; and
transmitting the data via the data sub-channel within the single channel environment, wherein
the control sub-channel and the data sub-channel are distinct sub-channels within the single channel environment,
the instructions are further executable by one or more processors to receive a firmware update for an application platform over via the single channel environment,
the instructions are further executable by one or more processors to store the firmware update to a datastore, and
the instructions are further executable by one or more processors to reboot the application platform using the firmware update.

8. The non-transitory computer-readable medium as recited in claim 7,
wherein the single channel environment is a TCP/IP environment; and
wherein providing distinct control and data sub-channels includes assigning a distinct port to each of the control and data sub-channels.

9. The non-transitory computer-readable medium as recited in claim 7,
wherein the single channel environment is a serial environment; and
wherein providing distinct control and data sub-channels includes implementing a communication layer protocol between a transaction interface of the single channel environment and an interconnectivity module that acts as an interface to the data producing device.

10. A method comprising:
updating firmware for a remote device, updating comprising:
receiving, by an interconnectivity module of the remote device, the firmware update over a network for an application platform of the remote device;
storing, by the interconnectivity module, the firmware update to a datastore of the remote device;
instructing, by the interconnectivity module, the application platform to reboot using the firmware update in the datastore;
wherein the firmware update is received via a data sub-channel of a single channel environment, and wherein instruction to reboot is received via a control sub-channel of the single channel environment that is distinct from the data sub-channel within the single channel environment.

11. The method as recited in claim 10, wherein the firmware update is stored to a datastore in accordance with one or more instructions received over the control sub-channel in the single channel environment.

12. The method as recited in claim 10, further comprising:
emulating distinct control and data channels in a single channel environment, wherein said emulating distinct control and data channels includes:

in a single channel environment,
    providing a control sub-channel for transmission of the control information;
    transmitting one or more control instructions via the control sub-channel;
    providing a data sub-channel for transmission of the logged data; and
    transmitting the logged data via the data sub-channel.

13. The method as recited in claim 12, wherein the control sub-channel and the data sub-channel are distinct sub-channels within the single channel environment.

14. The method as recited in claim 12,
    wherein the single channel environment is a TCP/IP environment; and
    wherein to provide distinct control and data sub-channels the network platform is configured to assign a distinct port to each of the control and data sub-channels.

15. The method as recited in claim 12,
    wherein the single channel environment is a serial environment; and
    wherein to provide distinct control and data sub-channels the network platform is configured to implement a communication layer protocol between a transaction interface of the single channel environment and an interconnectivity interface of the application platform.

16. The method as recited in claim 12, further comprising:
    prior to said updating firmware for the remote device,
        identifying a problem with the remote device;
        obtaining data indicative of the problem from the remote device; and
        establishing a data connection with the remote device for updating firmware for the remote device.

17. The method as recited in claim 12, further comprising:
    prior to said updating firmware for the remote device,
    sending an error message to a data system;
    receiving a control instruction from the data system; and
    implementing the control instruction, wherein implementing includes said receiving, by the interconnectivity module of the remote device, the firmware update over the network for the application platform of the remote device.

\* \* \* \* \*